United States Patent
Nakahara et al.

(10) Patent No.: US 10,526,430 B2
(45) Date of Patent: Jan. 7, 2020

(54) METHACRYLIC RESIN OR METHACRYLIC RESIN COMPOSITION

(71) Applicant: KURARAY Co., Ltd., Kurashiki-shi (JP)

(72) Inventors: Atsuhiro Nakahara, Tainai (JP); Toru Abe, Tainai (JP); Toru Takahashi, Tainai (JP); Hiroshi Ozawa, Tainai (JP)

(73) Assignee: KURARAY Co., Ltd., Kurashiki-shi (JP)

( * ) Notice: Subject to any disclaimer, the term of this patent is extended or adjusted under 35 U.S.C. 154(b) by 118 days.

(21) Appl. No.: 15/323,016

(22) PCT Filed: Jun. 30, 2015

(86) PCT No.: PCT/JP2015/068771
§ 371 (c)(1),
(2) Date: Dec. 29, 2016

(87) PCT Pub. No.: WO2016/002750
PCT Pub. Date: Jan. 7, 2016

(65) Prior Publication Data
US 2017/0183428 A1 Jun. 29, 2017

(30) Foreign Application Priority Data

Jun. 30, 2014 (JP) .................. 2014-134343
Aug. 29, 2014 (JP) .................. 2014-174914

(51) Int. Cl.
 *C08F 20/18* (2006.01)
 *C08L 33/12* (2006.01)
(52) U.S. Cl.
 CPC .............. *C08F 20/18* (2013.01); *C08L 33/12* (2013.01); *C08L 2205/025* (2013.01); *C08L 2205/03* (2013.01); *C08L 2205/035* (2013.01)
(58) Field of Classification Search
 None
 See application file for complete search history.

(56) References Cited

U.S. PATENT DOCUMENTS

| 5,280,070 A | 1/1994 | Drzewinski |
| 5,656,704 A | 8/1997 | Wang et al. |
| 8,829,099 B2 * | 9/2014 | Kumazawa ........... C08F 285/00 523/200 |
| 2013/0217827 A1 | 8/2013 | Ozawa et al. |
| 2016/0096937 A1 | 4/2016 | Takahashi et al. |

FOREIGN PATENT DOCUMENTS

| EP | 0 573 109 A2 | 5/1993 | |
| EP | 2 998 328 A1 | 3/2016 | |
| JP | 63-46254 A | 2/1988 | |
| JP | 64-14216 A | 1/1989 | |
| JP | 3-263412 A | 11/1991 | |
| JP | 6-287394 A | 10/1994 | |
| JP | 8-302145 A | 11/1996 | |
| JP | 9-201918 A | 8/1997 | |
| JP | 9-208645 A | 8/1997 | |
| JP | 2001-226429 A | 8/2001 | |
| JP | 2002-327012 A | 11/2002 | |
| JP | 2010-285483 A | 12/2010 | |
| JP | 2011-252098 A | 12/2011 | |
| WO | WO-2007007435 A1 * | 1/2007 | ............ C08F 285/00 |
| WO | WO 2012/057079 A1 | 5/2012 | |

OTHER PUBLICATIONS

International Search Report dated Oct. 6, 2015, in PCT/JP2015/068771 filed Jun. 30, 2015.

* cited by examiner

*Primary Examiner* — Christopher M Rodd
(74) *Attorney, Agent, or Firm* — Oblon, McClelland, Maier & Neustadt, L.L.P.

(57) ABSTRACT

A methacrylic resin composition comprises not less than 90% by mass and not more than 100% by mass of a methacrylic resin [A] having: the total content of a structural unit derived from methyl methacrylate of not less than 90% by mass; a molecular weight $M_A$ of not less than 30000 and not more than 100000 in terms of polystyrene corresponding to the retention time indicating the value of the maximum strength in a chromatogram obtained by gel permeation chromatography; the area $S_{gA}$ of a region enclosed by an approximate curve obtained by fitting the data of a range indicating the strength of not less than 70% relative to the value of the maximum strength to a Gaussian function by the method of nonlinear least squares and the base line of the chromatogram of 45 to 80% of the area $S_A$ enclosed by the chromatogram and its base line; and the ratio $Mw_{gA}/Mn_{gA}$ of a weight average molecular weight $Mw_{gA}$ to a number average molecular weight $Mn_{gA}$ of not less than 1.01 and not more than 1.20 in terms of polystyrene computed based on an approximate curve obtained by the above fitting.

26 Claims, 1 Drawing Sheet

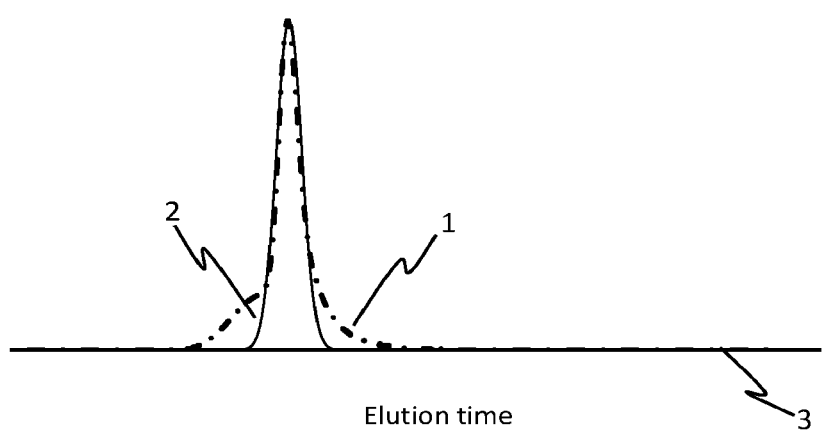
Elution time

US 10,526,430 B2

METHACRYLIC RESIN OR METHACRYLIC RESIN COMPOSITION

TECHNICAL FIELD

The present invention relates to a methacrylic resin or a methacrylic resin composition. More specifically, the present invention relates to a methacrylic resin or a methacrylic resin composition having excellent forming processability from which a formed article having high transparency, a low thermal contraction ratio, high thermal decomposition resistance, high strength and excellent surface smoothness can be obtained.

BACKGROUND ART

A methacrylic resin, which has high transparency, is useful as a material for a formed article used in an optical member, an illumination member, a signboard member, a decoration member or the like. However, a methacrylic resin for general forming has a glass transition temperature of as low as about 110° C., and thus a formed article comprising such methacrylic resin may have a problem of susceptibility to heat deformation.

A methacrylic resin having a high syndiotacticity is known to have a high glass transition temperature (see patent documents 1 and 2). However, since a methacrylic resin having a high syndiotacticity has inferior forming processability, a formed article comprising this methacrylic resin tends to have inferior surface smoothness. It is known that lowering the molecular weight can improve forming processability, but this may cause another problem that the resulting formed article has decreased mechanical strength. For this reason, a formed article comprising a methacrylic resin having a high syndiotacticity has not yet been available for practical use.

CITATION LIST

Patent Literature

Patent Document 1: JP H3-263412 A
Patent Document 2: JP 2002-327012 A

SUMMARY OF THE INVENTION

Problems to be Solved by the Invention

An objective of the present invention is to provide a methacrylic resin or a methacrylic resin composition having excellent forming processability, from which a formed article having high transparency, a low thermal contraction ratio, high thermal decomposition resistance, high strength and excellent surface smoothness can be obtained.

Means for Solving the Problems

As a result of extensive studies to achieve the above objective, the present invention which includes the following embodiments has been completed.

[1] A methacrylic resin, wherein the total content of a structural unit derived from methyl methacrylate is not less than 90% by mass, a molecular weight $M_A$ is not less than 30 thousand and not more than 100 thousand in terms of polystyrene corresponding to the retention time having the value of the maximum strength in a chromatogram obtained by gel permeation chromatography, the area $S_{gA}$ of a region enclosed by an approximate curve obtained by fitting only data having the strength of not less than 70% relative to the value of the maximum strength in the chromatogram to a Gaussian function by the method of nonlinear least squares and the base line of the chromatogram is 45 to 80% of the area $S_A$ of a region enclosed by the chromatogram and its base line; and the ratio $Mw_{gA}/Mn_{gA}$ of a weight average molecular weight $Mw_{gA}$ to a number average molecular weight $Mn_{gA}$ is not less than 1.01 and not more than 1.20 in terms of polystyrene computed based on the approximate curve obtained by the above fitting.

[2] The methacrylic resin according to [1], wherein the ratio $Mw_A/Mn_A$ of a weight average molecular weight $Mw_A$ to a number average molecular weight $Mn_A$ is 1.3 to 3.0 in terms of polystyrene computed based on the chromatogram obtained by gel permeation chromatography.

[3] The methacrylic resin according to [1] or [2], wherein the total content of the structural unit derived from methyl methacrylate is not less than 99% by mass.

[4] The methacrylic resin according to any one of [1] to [3], wherein a triad syndiotacticity (rr) is not less than 58%.

[5] The methacrylic resin according to any one of [1] to [4], wherein the midpoint glass transition temperature is not less than 120° C. as measured by differential scanning calorimetry.

[6] A methacrylic resin composition, comprising 100 parts by mass of the methacrylic resin according to any one of [1] to [5] and 1 to 10 parts by mass of a polycarbonate resin.

[7] A methacrylic resin composition, comprising 100 parts by mass of the methacrylic resin according to any one of [1] to [5] and 5 to 30 parts by mass of a crosslinked rubber.

[8] A methacrylic resin composition, comprising 100 parts by mass of the methacrylic resin according to any one of [1] to [5] and 0.1 to 10 parts by mass of a phenoxy resin.

[9] A methacrylic resin composition, comprising not less than 70% by mass of a methacrylic resin [A] having the total content of a structural unit derived from methyl methacrylate of not less than 90% by mass, wherein
a molecular weight $M_C$ is not less than 30 thousand and not more than 100 thousand in terms of polystyrene corresponding to the retention time having the value of the maximum strength in a chromatogram obtained by gel permeation chromatography;
the area $S_{gC}$ of a region enclosed by an approximate curve obtained by fitting only data having the strength of not less than 70% relative to the value of the maximum strength in the chromatogram to a Gaussian function by the method of nonlinear least squares and the base line of the chromatogram is 45 to 80% of the area $S_C$ of a region enclosed by the chromatogram and its base line; and the ratio $Mw_{gC}/Mn_{gC}$ of a weight average molecular weight $Mw_{gC}$ to a number average molecular weight $Mn_{gC}$ is not less than 1.01 and not more than 1.20 in terms of polystyrene computed based on the approximate curve obtained by the above fitting.

[10] The methacrylic resin composition according to [9], wherein the ratio $Mw_C/Mn_C$ of a weight average molecular weight $Mw_C$ to a number average molecular weight $Mn_C$ is 1.3 to 3.0 in terms of polystyrene computed based on the chromatogram obtained by gel permeation chromatography.

[11] The methacrylic resin composition according to [9] or [10], wherein the methacrylic resin [A] has a total content of the structural unit derived from methyl methacrylate of not less than 99% by mass.

[12] The methacrylic resin composition according to any one of [9] to [11], wherein the methacrylic resin [A] has a triad syndiotacticity (rr) of not less than 58%.

[13] The methacrylic resin composition according to any one of [9] to [12], wherein the midpoint glass transition temperature is not less than 120° C. as measured by differential scanning calorimetry.
[14] The methacrylic resin composition according to any one of [9] to [13], further comprising 1 to 10 parts by mass of a polycarbonate resin relative to 100 parts by mass of the methacrylic resin [A].
[15] The methacrylic resin composition according to any one of [9] to [13], further comprising 5 to 30 parts by mass of a crosslinked rubber relative to 100 parts by mass of the methacrylic resin [A].
[16] The methacrylic resin composition according to any one of [9] to [13], further comprising 0.1 to 10 parts by mass of a phenoxy resin relative to 100 parts by mass of the methacrylic resin [A].
[17] A formed article, comprising the methacrylic resin according to any one of [1] to [5] or the methacrylic resin composition according to any one of [6] to [16].
[18] A film, comprising the methacrylic resin according to any one of [1] to [5] or the methacrylic resin composition according to any one of [6] to [16].
[19] A stretched film, comprising the methacrylic resin according to any one of [1] to [5] or the methacrylic resin composition according to any one of [6] to [16].
[20] A phase difference film, comprising the methacrylic resin according to any one of [1] to [5] or the methacrylic resin composition according to any one of [6] to [16].
[21] A polarizer protective film, comprising the methacrylic resin according to any one of [1] to [5] or the methacrylic resin composition according to any one of [6] to [16].
[22] A method for manufacturing the methacrylic resin according to any one of [1] to [5], the method comprising melt-kneading a methacrylic resin [I] having a triad syndiotacticity (rr) of not less than 65% and a methacrylic resin [II] having a triad syndiotacticity (rr) of 45 to 58% in a mass ratio of the methacrylic resin [I] to the methacrylic resin [II] of 40/60 to 70/30.
[23] A method for manufacturing the methacrylic resin composition according to any one of [6] to [16], the method comprising melt-kneading a methacrylic resin [I] having a triad syndiotacticity (rr) of not less than 65% and a methacrylic resin [II] having a triad syndiotacticity (rr) of 45 to 58% in a mass ratio of the methacrylic resin [I] to the methacrylic resin [II] of 40/60 to 70/30 to obtain the methacrylic resin [A].
[24] A method for manufacturing the methacrylic resin composition according to [6] or [14], the method comprising melt-kneading a methacrylic resin [I] having a triad syndiotacticity (rr) of not less than 65%, a methacrylic resin [II] having a triad syndiotacticity (rr) of 45 to 58% and the polycarbonate resin in a mass ratio of the methacrylic resin [I] to the methacrylic resin [II] of 40/60 to 70/30.
[25] A method for manufacturing the methacrylic resin composition according to [7] or [15], the method comprising melt-kneading a methacrylic resin [I] having a triad syndiotacticity (rr) of not less than 65%, a methacrylic resin [II] having a triad syndiotacticity (rr) of 45 to 58%, and the crosslinked rubber in a mass ratio of the methacrylic resin [I] to the methacrylic resin [II] of 40/60 to 70/30.
[26] A method for manufacturing the methacrylic resin composition according to [8] or [16], the method comprising melt-kneading a methacrylic resin [I] having a triad syndiotacticity (rr) of not less than 65%, a methacrylic resin [II] having a triad syndiotacticity (rr) of 45 to 58%, and the phenoxy resin in a mass ratio of the methacrylic resin [I] to the methacrylic resin [II] of 40/60 to 70/30.

Advantageous Effects of the Invention

The methacrylic resin or the methacrylic resin composition of the present invention is excellent in forming processability. A formed article having high transparency, a low thermal contraction ratio, high thermal decomposition resistance, high strength and excellent surface smoothness can be obtained by forming the methacrylic resin or the methacrylic resin composition of the present invention.

BRIEF DESCRIPTION OF THE DRAWINGS

FIG. 1 is a graph for explanation of a chromatograph, an approximate curve and a base line.

EMBODIMENTS FOR CARRYING OUT THE INVENTION

A methacrylic resin according to an embodiment of the present invention is a methacrylic resin [A].

A methacrylic resin composition according to an embodiment of the present invention comprises the methacrylic resin [A]. In addition, in the specification of the present application, a resin material consisting of only the methacrylic resin [A] is also referred to a methacrylic resin composition.

[Methacrylic Resin [A]]

The methacrylic resin [A] is not particularly limited, as long as it has the total content of a structural unit derived from methyl methacrylate of not less than 90% by mass. In view of thermal resistance, the methacrylic resin [A] has the total content of a structural unit derived from methyl methacrylate of preferably not less than 95% by mass, more preferably not less than 98% by mass, even more preferably not less than 99% by mass, and most preferably 100% by mass.

The methacrylic resin [A] may contain a structural unit derived from a monomer other than methyl methacrylate. As a monomer other than methyl methacrylate, mentioned can be vinyl monomers having only one polymerizable carbon-carbon double bond in one molecule. Examples of the vinyl monomers can include methacrylic acid alkyl esters other than methyl methacrylate such as ethyl methacrylate, butyl methacrylate and the like; methacrylic acid aryl esters such as phenyl methacrylate and the like; methacrylic acid cycloalkyl esters such as cyclohexyl methacrylate, norbornenyl methacrylate and the like; acrylic acid alkyl esters such as methyl acrylate, ethyl acrylate, propyl acrylate, butyl acrylate, 2-ethylhexyl acrylate and the like; acrylic acid aryl esters such as phenyl acrylate and the like; acrylic acid cycloalkyl esters such as cyclohexyl acrylate, norbornenyl acrylate and the like; aromatic vinyl compounds such as styrene, α-methyl styrene and the like; acrylamide; methacrylamide; acrylonitrile; methacrylonitrile; and the like.

The methacrylic resin [A] has a molecular weight $M_A$ (also referred to as peak top molecular weight) of preferably not less than 30000 and not more than 100000, more preferably not less than 40000 and not more than 95000, and even more preferably not less than 50000 and not more than 90000 in terms of polystyrene corresponding to the retention time having the value of the maximum strength in a chromatogram obtained by gel permeation chromatography.

Determination by gel permeation chromatography can be performed as follows. Tetrahydrofuran as an eluent, and two TOSOH TSKgel SuperMultipore HZM-M columns connected in sequence with SuperHZ4000 are used. As an analysis instrument, TOSOH HLC-8320 (model number)

equipped with a differential refractive index detector (RI detector) is used. A resin material to be tested, that is, 4 mg of a methacrylic resin or a methacrylic resin composition is dissolved in 5 ml of tetrahydrofuran, and then the resultant is filtered using a 0.1-μm filter, thereby preparing a test subject solution. A column oven is set at a temperature of 40° C., 20 μl of the test subject solution is injected at an eluent flow rate of 0.35 ml/min, and then a chromatogram is determined.

A chromatogram is a chart produced by plotting electrical signal values (strength Y) resulting from refractive index differences between a test subject solution and a reference solution with respect to retention time X.

Standard polystyrenes having molecular weights of 400-5000000 were subjected to measurement by gel permeation chromatography, and then a calibration curve showing the relationship between the retention time and the molecular weights was created. In the chromatogram, a line obtained by connecting a point at which the slope on the high molecular weight side of a peak changes from zero to a positive value and a point at which the slope on the low molecular weight side of the peak changes from a negative value to zero was designated as a base line. When the chromatogram has a plurality of peaks, a line obtained by connecting a point at which the slope of a peak on the highest molecular weight side changes from zero to a positive value and a point at which the slope of a peak on the lowest molecular weight side changes from a negative value to zero was designated as a base line.

The methacrylic resin [A] has area $S_{gA}$ of usually 45 to 80%, and more preferably 50 to 79% relative to area $S_A$ (see FIG. 1). The area $S_{gA}$ is a square measure of a region enclosed by approximate curve 2 and base line 3 of the chromatogram 1 obtained by gel permeation chromatography and the area $S_A$ is a square measure of a region enclosed by the chromatogram 1 and the base line 3 thereof. The approximate curve 2 is produced by fitting only data having the strength of not less than 70% relative to the value of the maximum strength in chromatogram 1 obtained by gel permeation chromatography to a Gaussian function by the nonlinear least squares method.

The methacrylic resin [A] has a ratio $Mw_{gA}/Mn_{gA}$ of a weight average molecular weight $Mw_{gA}$ to a number average molecular weight $Mn_{gA}$ of usually not less than 1.01 and not more than 1.20, and more preferably not less than 1.02 and not more than 1.10 in terms of polystyrene computed based on the approximate curve obtained by the above fitting.

In addition, a function represented by $Y=\exp(-[(X-u)^2/w^2])$ was used as a Gaussian function. A chromatogram obtained by gel permeation chromatography was standardized using the value of the maximum strength as 1 in the chromatogram. Only data having the strength of not less than 0.7 (70%) relative to the value of the maximum strength were compiled and then fitted to the above Gaussian function by the method of nonlinear least squares. In addition, Y is a value of strength in the standardized chromatogram, X is retention time, and w and u are variables. The retention time involving the value of the maximum strength was used as the initial value of u. As the initial value of w, an arbitrary numerical value was used for computation by the least-squares method.

Furthermore, the methacrylic resin [A] has a weight average molecular weight $Mw_A$ of preferably 50000 to 150000, more preferably 52000 to 120000, and even more preferably 55000 to 100000 in terms of polystyrene computed based on a chromatogram obtained by gel permeation chromatography.

The methacrylic resin [A] has a ratio $Mw_A/Mn_A$ of the weight average molecular weight $Mw_A$ to a number average molecular weight $Mn_A$ of generally not less than 1.2 and not more than 3.5, preferably not less than 1.3 and not more than 3.0, and preferably not less than 1.4 and not more than 2.7 in terms of polystyrene computed based on a chromatogram obtained by gel permeation chromatography.

The methacrylic resin [A] has a lower limit of a triad syndiotacticity (rr) of preferably 58%, more preferably 59%, and even more preferably 60%. There is no particular limitation for the upper limit of a triad syndiotacticity (rr) of the methacrylic resin [A], and the upper limit is preferably 99%, more preferably 85%, even more preferably 77%, even more preferably 65%, and most preferably 64% in view of film formability.

In addition, in the case of a resin composition comprising a mixture of the methacrylic resin [A] and another resin, the methacrylic resin [A] is fractionated by extraction from the resin composition and can be subjected to determination.

As used herein, triad syndiotacticity (rr) (hereinafter, may simply be referred to as "syndiotacticity (rr)") refers to a percentage where two linkages (diad) of two consecutive structural units in a linkage (triad) of three consecutive structural units are both in racemo (denoted as rr). Additionally, in a linkage (diad) of two structural units in a polymer molecule, the two structural units having the same three-dimensional configuration are called meso, and otherwise called racemo, which are denoted as m and r, respectively.

Triad syndiotacticity (rr) (%) can be calculated by obtaining a $^1$H-NMR spectrum in deuterated chloroform at 30° C.; determining the area (X) of a region between 0.6 and 0.95 ppm and the area (Y) of a region between 0.6 and 1.35 ppm in the spectrum when TMS is taken as 0 ppm; and using them in the expression (X/Y)×100.

The methacrylic resin [A] has a melt flow rate of preferably not less than 0.1 g/10 min, more preferably 0.2 to 30 g/10 min, even more preferably 0.5 to 20 g/10 min, and most preferably 1.0 to 10 g/10 min, the melt flow rate being determined under the conditions of 230° C. and a load of 3.8 kg.

Moreover, the methacrylic resin [A] has a glass transition temperature of preferably not less than 120° C., more preferably not less than 123° C., and even more preferably not less than 124° C. There is no particular limitation for the upper limit of the glass transition temperature of the methacrylic resin [A], but it is preferably 130° C.

The glass transition temperature is a midpoint glass transition temperature found from a DSC curve. The DSC curve is obtained by differential scanning calorimetry during the second heating when a resin to be measured is heated to 230° C. using a differential scanning calorimeter in accordance with JIS K7121, cooled to room temperature, and then heated from room temperature to 230° C. at 10° C./min.

The methacrylic resin [A] can be obtained by any manufacturing method. For example, the methacrylic resin [A] can be obtained by polymerizing methyl methacrylate or polymerizing methyl methacrylate with another monomer. Polymerization can be performed by a known method. Examples of polymerization methods can include, under classification based on the mode of chain transfer, radical polymerization, anionic polymerization and the like. Further, examples of the same under classification based on the mode of a reaction liquid can include bulk polymerization, solution polymerization, suspension polymerization, emulsion polymerization and the like. A molecular weight distribution can be controlled by regulating the types, the amounts, the timing for addition, and the like of chain transfer agents, polymerization initiators, and the like. Such controlling of molecular weight distribution is a technique well known by a person skilled in the art, and manufacturing a resin having a target molecular weight distribution is not difficult for a person skilled in the art.

The methacrylic resin [A] is preferably obtained by a method that involves melt-kneading a methacrylic resin [I] and a methacrylic resin [II]. Additionally, the methacrylic resin composition according to an embodiment of the present invention is mentioned several times as follows, and these mentions can naturally, in many cases, be similarly applied to the methacrylic resin according to an embodiment of the present invention.

The methacrylic resin [I] has a triad syndiotacticity (rr) of preferably not less than 65%, more preferably 70 to 90%, and even more preferably 72 to 85%. The aforementioned syndiotacticity of not less than 65% can increase the glass transition temperature of the methacrylic resin composition according to the present invention and can easily give a formed article having high surface hardness.

The methacrylic resin [1] has a weight average molecular weight $Mw_1$ of preferably 40000 to 150000, more preferably 40000 to 120000, and even more preferably 50000 to 100000 in terms of polystyrene computed based on a chromatogram obtained by gel permeation chromatography. When the $Mw_1$ is not less than 40000, a formed article obtained from the methacrylic resin composition tends to have improved impact resistance and toughness, and in the case of not more than 150000, the methacrylic resin composition tends to have an improved fluidity, which in turn improves forming processability.

The methacrylic resin [I] has the lower limit of a ratio $Mw_1/Mn_1$ of the weight average molecular weight $Mw_1$ to a number average molecular weight $Mn_1$ of preferably 1.01, more preferably 1.05, and even more preferably 1.06, and has the upper limit of the same of preferably 1.2, more preferably 1.15, and even more preferably 1.13 in terms of polystyrene computed based on a chromatogram obtained by gel permeation chromatography. When the methacrylic resin [I] having $Mw_1/Mn_1$ in such a range is used, a formed article having excellent mechanical strength can easily be obtained. $Mw_1$ and $Mn_1$ can be controlled by adjusting the type, the amount, and the timing for addition of a polymerization initiator or a chain transfer agent to be used for manufacturing the methacrylic resin [I].

The glass transition temperature of the methacrylic resin [I] is preferably not less than 125° C., more preferably not less than 128° C., and even more preferably not less than 130° C. The upper limit of the glass transition temperature of the methacrylic resin [I] is preferably 140° C. The glass transition temperature can be controlled by regulating a molecular weight, a syndiotacticity (rr) and the like. As the glass transition temperature of the methacrylic resin [I] increases, that of the resulting methacrylic resin composition increases. Therefore, a formed article comprising the methacrylic resin composition unlikely undergoes deformation such as thermal contraction.

The methacrylic resin [I] has the content of a structural unit derived from a methacrylic acid ester of preferably not less than 90% by mass, more preferably not less than 95% by mass, even more preferably not less than 98% by mass, still more preferably not less than 99% by mass, and most preferably 100% by mass.

Examples of such a methacrylic acid ester can include: methacrylic acid alkyl esters such as methyl methacrylate, ethyl methacrylate, butyl methacrylate and the like; methacrylic acid aryl esters such as phenyl methacrylate and the like; and methacrylic acid cycloalkyl esters such as cyclohexyl methacrylate, norbornenyl methacrylate and the like. Among these, methacrylic acid alkyl esters are preferred, and methyl methacrylate is most preferred.

The methacrylic resin [I] has the content of a structural unit derived from methyl methacrylate among the structural units derived from methacrylic acid esters of preferably not less than 90% by mass, more preferably not less than 95% by mass, even more preferably not less than 98% by mass, still more preferably not less than 99% by mass, and most preferably 100% by mass.

Examples of structural units other than those derived from methacrylic acid esters, which can be comprised in the methacrylic resin [I], can include structural units derived from vinyl monomers having only one polymerizable carbon-carbon double bond in one molecule. As such vinyl monomers, mentioned can be acrylic acid alkyl esters such as methyl acrylate, ethyl acrylate, propyl acrylate, butyl acrylate, 2-ethylhexyl acrylate and the like; acrylic acid aryl esters such as phenyl acrylate and the like; acrylic acid cycloalkyl esters such as cyclohexyl acrylate, norbornenyl acrylate and the like; aromatic vinyl compounds such as styrene, α-methyl styrene and the like; acrylamide; methacrylamide; acrylonitrile; methacrylonitrile; and the like.

The methacrylic resin [I] may be obtained by any manufacturing method. In view of high productivity, high thermal decomposition resistance, less foreign substances, less dimers and less trimers of methacrylic acid esters, and the excellent appearance of a formed article, preferred is the methacrylic resin [I] manufactured by the anionic polymerization method comprising adjusting a polymerization temperature, a polymerization duration, the type and amount of a chain transfer agent, the type and amount of a polymerization initiator and the like.

Examples of the aforementioned anionic polymerization method can include a method comprising performing anionic polymerization in the presence of a mineral acid salt such as a salt of alkali metal or alkali earth metal using an organo alkali metal compound as a polymerization initiator (see JP H07-25859 B), a method comprising performing anionic polymerization in the presence of an organo aluminum compound using an organo alkali metal compound as a polymerization initiator (see JP H11-335432 A), and a method comprising performing anionic polymerization using an organo rare earth metal complex as a polymerization initiator (see JP H06-93060 A).

Alkyllithium such as n-butyllithium, sec-butyllithium, isobutyllithium, tert-butyllithium, and the like is preferably used as a polymerization initiator in the anionic polymerization method for manufacturing the methacrylic resin [I]. Further, an organo aluminum compound is preferably allowed to coexist in view of productivity.

Examples of an organoaluminum compound can include compounds represented by the formula $AlR^1R^2R^3$ (wherein $R^1$, $R^2$, and $R^3$ each independently represent an optionally substituted alkyl group, an optionally substituted cycloalkyl group, an optionally substituted aryl group, an optionally substituted aralkyl group, an optionally substituted alkoxyl group, an optionally substituted aryloxy group or N,N-disubstituted amino group. Further, $R^2$ and $R^3$ may join together to form an optionally substituted arylenedioxy group.).

Specific examples of an organoaluminum compound can include isobutyl bis(2,6-di-tert-butyl-4-methylphenoxy)aluminum, isobutyl bis(2,6-di-tert-butylphenoxy)aluminum, isobutyl [2,2'-methylenebis(4-methyl-6-tert-butylphenoxy)] aluminum and the like.

Further, in the case of the anionic polymerization method, an ether, a nitrogen-containing compound or the like can also be allowed to coexist in order to control a polymerization reaction.

The methacrylic resin [II] has a triad syndiotacticity (rr) of preferably 45 to 58%, more preferably 49 to 55%. In a case where the syndiotacticity (rr) is not less than 45%, the glass transition temperature of the methacrylic resin composition of the present invention tends to be increased. In a case where the syndiotacticity (rr) is not more than 58%, the forming processability of the methacrylic resin composition of the present invention tends to be improved.

The methacrylic resin [II] has a weight average molecular weight $Mw_2$ of preferably 40000 to 180000, more preferably 50000 to 150000, and even more preferably 50000 to 120000 in terms of polystyrene computed based on a chromatogram obtained by gel permeation chromatography. In a case where the $Mw_2$ is not less than 40000, the impact resistance and toughness of a formed article obtained from the methacrylic resin composition tend to be improved. In a case where the $Mw_2$ is not more than 180000, the fluidity of the methacrylic resin composition tends to be improved, which in turn improves forming processability.

The methacrylic resin [II] has a ratio ($Mw_2/Mn_2$) of the weight average molecular weight $Mw_2$ to a number average molecular weight $Mn_2$ of preferably 1.7 to 2.6, more preferably 1.7 to 2.3, and even more preferably 1.7 to 2.0 in terms of polystyrene computed based on a chromatogram obtained by gel permeation chromatography. When the methacrylic resin [II] having the ratio ($Mw_2/Mn_2$) within such a range is used, a formed article having excellent mechanical strength can easily be obtained. $Mw_2$ and $Mn_2$ can be controlled by adjusting the type, the amount, and the timing for addition of a polymerization initiator or a chain transfer agent to be used for manufacturing the methacrylic resin [II].

The methacrylic resin [II] has a glass transition temperature of preferably not less than 100° C., more preferably not less than 110° C., even more preferably not less than 115° C., and most preferably not less than 117° C. The upper limit of the glass transition temperature of the methacrylic resin [II] is usually 122° C. and preferably 120° C. The glass transition temperature can be controlled by regulating a molecular weight and/or syndiotacticity (rr), for example. In a case where the glass transition temperature of the methacrylic resin [II] is within these ranges, the thermal resistance of the methacrylic resin composition is increased. Therefore, a formed article which unlikely undergoes deformation such as thermal contraction can easily be obtained.

The methacrylic resin [II] has the content of a structural unit derived from a methacrylic acid ester of preferably not less than 90% by mass, more preferably not less than 95% by mass, even more preferably not less than 98% by mass, still more preferably not less than 99% by mass, and most preferably 100% by mass. Examples of such a methacrylic acid ester can include: methacrylic acid alkyl esters such as methyl methacrylate, ethyl methacrylate, butyl methacrylate and the like; methacrylic acid aryl esters such as phenyl methacrylate and the like; and methacrylic acid cycloalkyl esters such as cyclohexyl methacrylate, norbornenyl methacrylate and the like. A methacrylic acid alkyl ester is preferred, and methyl methacrylate is most preferred.

The methacrylic resin [II] has the content of a structural unit derived from methyl methacrylate among the structural units derived from the above methacrylic acid esters of preferably not less than 90% by mass, more preferably not less than 95% by mass, even more preferably not less than 98% by mass, still more preferably not less than 99% by mass, and most preferably 100% by mass.

Examples of structural units other than those derived from methacrylic acid esters, which can be contained in the methacrylic resin [II], can include: structural units derived from vinyl monomers having only one polymerizable carbon-carbon double bond in one molecule. As the vinyl monomers, mentioned can be acrylic acid alkyl esters such as methyl acrylate, ethyl acrylate, propyl acrylate, butyl acrylate, 2-ethylhexyl acrylate and the like; acrylic acid aryl esters such as phenyl acrylate and the like; acrylic acid cycloalkyl esters such as cyclohexyl acrylate, norbornenyl acrylate and the like; aromatic vinyl compounds such as styrene, α-methyl styrene and the like; acrylamide; methacrylamide; acrylonitrile; methacrylonitrile; and the like.

The methacrylic resin [II] may be obtained by any manufacturing method. In view of productivity, preferred is the methacrylic resin [II] manufactured by the radical polymerization method comprising adjusting a polymerization temperature, a polymerization duration, the type and amount of a chain transfer agent, the type and amount of a polymerization initiator and the like.

The above radical polymerization method is preferably performed in the absence or presence of a solvent, and preferably performed in the absence of a solvent in order to obtain the methacrylic resin [II] having a low impurity concentration. In order to reduce the development of silver streak and/or coloring in a formed article, a polymerization reaction is preferably performed with the level of dissolved oxygen maintained low. Further, a polymerization reaction is preferably performed under an inert gas atmosphere such as nitrogen gas.

There is no particular limitation for a polymerization initiator to be used in the radical polymerization method for manufacturing the methacrylic resin [II] as long as it generates a reactive radical. Examples of the polymerization initiator can include t-hexylperoxyisopropyl monocarbonate, t-hexylperoxy 2-ethylhexanoate, 1,1,3,3-tetramethylbutylperoxy 2-ethylhexanoate, t-butylperoxy pivalate, t-hexylperoxy pivalate, t-butylperoxy neodecanoate, t-hexylperoxy neodecanoate, 1,1,3,3-tetramethylbutylperoxy neodecanoate, 1,1-bis(t-hexylperoxy) cyclohexane, benzoyl peroxide, 3,5,5-trimethylhexanoyl peroxide, lauroyl peroxide, 2,2'-azobis(2-methylpropionitrile), 2,2'-azobis(2-methylbutyronitrile), dimethyl 2,2'-azobis(2-methylpropionate) and the like. Among these, t-hexylperoxy 2-ethylhexanoate, 1,1-bis(t-hexylperoxy) cyclohexane, and dimethyl 2,2'-azobis(2-methylpropionate) are preferred.

The 1-hour half-life temperature of such a polymerization initiator is preferably 60 to 140° C., more preferably 80 to 120° C. Further, a polymerization initiator to be used for manufacturing the methacrylic resin [II] has a hydrogen abstraction ability of preferably not more than 20%, more preferably not more than 10%, and even more preferably not more than 5%. These polymerization initiators can be used alone or in combination of two or more. The used amount of a polymerization initiator is preferably 0.0001 to 0.02 part by mass, more preferably 0.001 to 0.01 part by mass, and even more preferably 0.005 to 0.007 part by mass relative to 100 parts by mass of a monomer subjected to a polymerization reaction.

Note that the hydrogen abstraction abilities can be available in technical documents from manufacturers of polymerization initiators (for example, a technical report from NOF Corporation, "The hydrogen abstraction abilities of organoperoxides and initiator efficiency" (created on April, 2003) and the like. Further, they can be measured by the radical trapping method in which α-methylstyrene dimers are used, i.e., the α-methylstyrene dimer trapping method. The above determination is usually performed as follows. First, a polymerization initiator is cleaved in the co-presence of α-methylstyrene dimers as a radical trapping agent to generate radical fragments. Among the radical fragments generated, a radical fragment with a low hydrogen abstraction ability binds to and is captured by a double bond of an α-methylstyrene dimer. In contrast, a radical fragment with a high hydrogen abstraction ability abstracts a hydrogen from cyclohexane to generate a cyclohexyl radical, which binds to and is captured by a double bond of an α-methylstyrene dimer, so as to generate captured products of cyclohexane. As used herein, the hydrogen abstraction ability is a ratio (molar ratio) of radical fragments with a high hydrogen abstraction ability to a theoretical yield of radical fragments as determined by quantifying cyclohexane or captured products of cyclohexane.

Examples of a chain transfer agent to be used in the radical polymerization method for manufacturing the methacrylic resin [II] can include alkyl mercaptans such as n-octylmercaptan, n-dodecylmercaptan, t-dodecylmercaptan, 1,4-butanedithiol, 1,6-hexanedithiol, ethyleneglycol bisthiopropionate, butanediol bisthioglycolate, butanediol bisthiopropionate, hexandiol bisthioglycolate, hexandiol bisthiopropionate, trimethylolpropane tris-(β-thiopropionate), pentaerythritol tetrakisthiopropionate and the like. Among these, monofunctional alkyl mercaptans such as n-octylmercaptan, and n-dodecylmercaptan are preferred. These chain transfer agents can be used alone or in combination of two or more.

The used amount of such a chain transfer agent is preferably 0.1 to 1 part by mass, more preferably 0.15 to 0.8 part by mass, even more preferably 0.2 to 0.6 part by mass, and most preferably 0.2 to 0.5 part by mass relative to 100 parts by mass of a monomer subjected to a polymerization reaction. Further, the used amount of such a chain transfer agent is preferably 2500 to 10000 parts by mass, more preferably 3000 to 9000 parts by mass, and even more preferably 3500 to 6000 parts by mass relative to 100 parts by mass of a polymerization initiator. In a case where the used amount of a chain transfer agent falls in the above ranges, the resulting methacrylic resin composition tends to have good forming processability and high mechanical strength.

There is no limitation for a solvent to be used in the radical polymerization method for manufacturing the methacrylic resin [II] as long as a monomer and the methacrylic resin [II] can be dissolved therein, but it is preferably an aromatic hydrocarbon such as benzene, toluene, ethylbenzene and the like. These solvents can be used alone or in combination of two or more. The used amount of a solvent can be appropriately adjusted in view of the viscosity of a reaction liquid and productivity. For example, the used amount of a solvent is preferably not more than 100 parts by mass, and more preferably not more than 90 parts by mass relative to 100 parts by mass of raw materials for polymerization reaction.

The temperature during a polymerization reaction is preferably 100 to 200° C., more preferably 110 to 180° C. In a case where the polymerization temperature is not less than 100° C., the productivity tends to be improved because of an improved polymerization rate, a reduced viscosity of a polymerization liquid and the like. Further, in a case where the polymerization temperature is not more than 200° C., a polymerization rate can be controlled easily, and the formation of by-products can be suppressed. Therefore, the coloring of the methacrylic resin composition of the present invention can be suppressed. The duration of a polymerization reaction is preferably 0.5 to 4 hours, more preferably 1.5 to 3.5 hours, and even more preferably 1.5 to 3 hours. Note that in the case of a continuous flow reactor, the duration of a polymerization reaction corresponds to the mean residence time in the reactor. In a case where the temperature during a polymerization reaction and the duration of the polymerization reaction fall in these ranges, the methacrylic resin [II] having excellent transparency can be produced in high efficiency.

The polymerization conversion ratio in the radical polymerization method for manufacturing the methacrylic resin [II] is preferably 20 to 80% by mass, more preferably 30 to 70% by mass, and even more preferably 35 to 65% by mass. In a case where the polymerization conversion ratio is not less than 20% by mass, the remaining unreacted monomers can be easily removed, and a formed article comprising the methacrylic resin composition tends to have a good appearance. In a case where the polymerization conversion ratio is not more than 70% by mass, the viscosity of the polymerization liquid tends to be reduced, leading to improved productivity.

Although radical polymerization may be performed using a batch reactor system, radical polymerization is preferably performed using a continuous flow reactor system in view of productivity. In the case of a continuous flow reaction, for example, a polymerization reaction raw material (a mixture comprising a monomer, a polymerization initiator, a chain transfer agent and the like) is prepared under a nitrogen atmosphere, this is then fed to a reactor at a constant flow rate while the liquid in the reactor is withdrawn at a flow rate corresponding to the feeding rate. As a reactor, a tube reactor which can create near plug flow conditions and/or a tank reactor which can create near complete mixing conditions can be used. Further, polymerization may be performed in one reactor according to the continuous flow method, or may be performed in two or more reactors connected together according to the continuous flow method. In the present invention, at least one continuous flow tank reactor is preferably used. The liquid volume in a tank reactor upon polymerization reaction is preferably ¼ to ¾, more preferably ⅓ to ⅔ relative to the capacity of the tank reactor. The reactor is usually equipped with a stirrer. Examples of a stirrer can include a static stirrer, and a dynamic stirrer. Examples of a dynamic stirrer can include a Max blend stirrer, a stirrer having lattice-shaped impellers which rotate around a vertical rotation axis arranged at the center, a propeller stirrer, a screw stirrer or the like. Among these, a Max blend stirrer is preferably used in view of homogeneous mixing performance.

After the completion of polymerization, volatile matters such as unreacted monomers are removed, if needed. There is no particular limitation for a method of removal, but heating devolatilization is preferred. Examples of a devolatilization method can include the equilibrium flash mode, and the adiabatic flash mode. The devolatilization temperature in the adiabatic flash mode is preferably 200 to 280° C., more preferably 220 to 260° C. The duration of heating a resin in the adiabatic flash mode is preferably 0.3 to 5 minutes, more preferably 0.4 to 3 minutes, and even more preferably 0.5 to 2 minutes. In a case where devolatilization is performed in these temperature ranges and these heating durations, the methacrylic resin [II] with less coloring can easily be obtained. Removed unreacted monomers can be recovered to be recycled in the polymerization reaction. The yellow index of the recovered monomers may be increased due to the heat applied during recovery operations and the like.

The recovered monomers are preferably refined by an appropriate method to reduce the yellow index.

The mass ratio of the methacrylic resin [I]/the methacrylic resin [II], in which the methacrylic resins [I] and {II} are used for obtaining the methacrylic resin [A], is preferably 40/60 to 90/10, more preferably 40/60 to 70/30, even more preferably 45/55 to 65/35, and most preferably 50/50 to 60/40. In a case where the mass ratio of the methacrylic resin [I]/the methacrylic resin [II] falls in the above ranges, a methacrylic resin composition can be obtained more easily in which a good forming processability and a high glass transition temperature are simultaneously achieved.

The methacrylic resin [A] can be used alone or kneaded with another component and then used. The methacrylic resin [A] that can be contained in the methacrylic resin composition of the present invention is usually not less than 70% by mass, preferably not less than 80% by mass, and more preferably not less than 90% by mass.

The methacrylic resin composition according to another embodiment of the present invention comprises the methacrylic resin [A] and a polycarbonate resin. In a case where a polycarbonate resin is contained, the phase difference in the resulting formed article can be adjusted.

[Polycarbonate Resin]

A polycarbonate resin to be used in the present invention is preferably an aromatic polycarbonate resin in view of compatibility. A polycarbonate resin is a polymer obtained by reacting a polyfunctional hydroxy compound with a carbonate-forming compound. The amount of a polycarbonate resin is preferably 1 to 10 parts by mass, more preferably 2 to 7 parts by mass, and even more preferably 3 to 6 parts by mass relative to 100 parts by mass of the methacrylic resin [A].

An aromatic polycarbonate resin to be used in the present invention is not particularly limited by the manufacturing methods thereof. Examples thereof can include the phosgene method (interfacial polymerization method), the melt polymerization method (transesterification method) and the like. Further, an aromatic polycarbonate resin that is preferably used in the present invention may be a post-treated polycarbonate resin which is manufactured by the melt polymerization method and a post-treatment for adjusting the amount of terminal hydroxy groups.

Examples of a polyfunctional hydroxy compound which is a raw material for manufacturing a polycarbonate resin can include optionally substituted 4,4'-dihydroxybiphenyls; optionally substituted bis(hydroxyphenyl)alkanes; optionally substituted bis(4-hydroxyphenyl)ethers; optionally substituted bis(4-hydroxyphenyl)sulfides; optionally substituted bis(4-hydroxyphenyl)sulfoxides; optionally substituted bis(4-hydroxyphenyl)sulfones; optionally substituted bis(4-hydroxyphenyl)ketones; optionally substituted bis(hydroxyphenyl)fluorenes; optionally substituted dihydroxy-p-terphenyls; optionally substituted dihydroxy-p-quarterphenyls; optionally substituted bis(hydroxyphenyl)pyrazines; optionally substituted bis(hydroxyphenyl)menthanes; optionally substituted bis[2-(4-hydroxyphenyl)-2-propyl]benzens; optionally substituted dihydroxynaphthalenes; optionally substituted dihydroxybenzenes; optionally substituted polysiloxanes; optionally substituted dihydroperfluoroalkanes and the like.

Among these polyfunctional hydroxy compounds, preferred are 2,2-bis(4-hydroxyphenyl)propane, 1,1-bis(4-hydroxyphenyl)cyclohexane, bis(4-hydroxyphenyl)diphenylmethane, 1,1-bis(4-hydroxyphenyl)-1-phenylethane, 2,2-bis(4-hydroxy-3-methylphenyl)propane, 2,2-bis(4-hydroxy-3-phenylphenyl)propane, 4,4'-dihydroxybiphenyl, bis(4-hydroxyphenyl)sulfone, 2,2-bis(3,5-dibromo-4-hydroxyphenyl)propane, 3,3-bis(4-hydroxyphenyl)pentane, 9,9-bis(4-hydroxy-3-methylphenyl)fluorene, bis(4-hydroxyphenyl)ether, 4,4'-dihydroxybenzophenone, 2,2-bis(4-hydroxy-3-methoxypheny)1,1,1,3,3-hexafluoropropane, α,ω-bis[3-(2-hydroxyphenyl)propyl]polydimethylsiloxane, resorcin, and 2,7-dihydroxynaphthalene. In particular, 2,2-bis(4-hydroxyphenyl)propane is preferred.

Examples of a carbonate-forming compound can include various dihalogenated carbonyls such as phosgene and the like, haloformates such as chloroformate and the like, carbonate compounds such as bisaryl carbonate and the like. The amount of the carbonate-forming compound may be appropriately adjusted in consideration of the stoichiometry ratio (equivalence) of a reaction with a polyfunctional hydroxy compound.

A polymerization reaction is usually performed in a solvent in the presence of an acid binding agent. Examples of an acid binding agent can include alkali metal hydroxides such as sodium hydroxide, potassium hydroxide, lithium hydroxide, cesium hydroxide and the like; alkali metal carbonates such as sodium carbonate, potassium carbonate and the like; tertiary amines such as trimethylamine, triethylamine, tributylamine, N,N-dimethylcyclohexylamine, pyridine, dimethylaniline and the like; quaternary ammonium salts such as trimethylbenzylammonium chloride, triethylbenzylammonium chloride, tributylbenzylammonium chloride, trioctylmethylammonium chloride, tetrabuthylammonium chloride, tetrabutylammonium bromide and the like; and quaternary phosphonium salts such as tetrabuthylphosphonium chloride, tetrabuthylphosphonium bromide and the like. Further, a small amount of an antioxidizing agent such as sodium sulfite, hydrosulfide and the like may be added to this reaction system, if desired. The amount of an acid biding agent may be appropriately adjusted in consideration of the stoichiometry ratio (equivalence) of a reaction. Specifically, an acid binding agent may be used in 1 equivalence or excess, preferably 1 to 5 equivalences per mole of a hydroxyl group of a polyfunctional hydroxy compound as a raw material.

Further, a known end terminator and branching agent can be used for the reaction. Examples of an end terminator can include p-tert-butyl-phenol, p-phenylphenol, p-cumylphenol, p-perfluorononylphenol, p-(perfluorononylphenyl)phenol, p-(perfluoroxylphenyl)phenol, p-tert-perfluorobutylphenol, 1-(P-hydroxybenzyl)perfluorodecane, p-[2-(1H,1H-perfluorotridodecyloxy)-1,1,1,3,3,3-hexa fluoropropyl]phenol, 3,5-bis(perfluorohexyloxycarbonyl)phenol, perfluorododecyl p-hydroxybenzoate, p-(1H,1H-perfluorooctyloxy)phenol, 2H,2H,9H-perfluorononanoic acid, 1,1,1,3,3,3-tetrafloro-2-propanol and the like.

Examples of a branching agent can include floroglycine, pyrogallol, 4,6-dimethyl-2,4,6-tris(4-hydroxyphenyl)-2-heptene, 2,6-dimethyl-2,4,6-tris(4-hydroxyphenyl)-3-heptene, 2,4-dimethyl-2,4,6-tris(4-hydroxyphenyl)heptane, 1,3,5-tris(2-hydroxyphenyl)benzene, 1,3,5-tris(4-hydroxyphenyl)benzene, 1,1,1-tris(4-hydroxyphenyl)ethane, tris(4-hydroxyphenyl)phenylmethane, 2,2-bis[4,4-bis(4-hydroxyphenyl)cyclohexyl]propane, 2,4-bis[2-bis(4-hydroxyphenyl)-2-propyl]phenol, 2,6-bis(2-hydroxy-5-methylbenzyl)-4-methylphenol, 2-(4-hydroxyphenyl)-2-(2,4-dihydroxyphenyl)propane, tetrakis(4-hydroxyphenyl)methane, tetrakis[4-(4-hydroxyphenylisopropyl)phenoxy]

methane, 2,4-dihydroxybenzoic acid, trimesic acid, cyanuric acid, 3,3-bis(3-methyl-4-hydroxyphenyl)-2-oxo-2,3-dihydroindole, 3,3-bis(4-hydroxyaryl)oxyindole, 5-chloroisatin, 5,7-dichloroisatin, 5-bromoisatin and the like.

A polycarbonate resin may contain a unit having a polyester, polyurethane, polyether or polysiloxane structure in addition to a polycarbonate unit.

In view of that phase difference can easily be controlled to a desired value and a formed article having excellent transparency can be obtained, preferably used is a polycarbonate resin having an MVR value of preferably 1 to 100 thousand $cm^3/10$ min, more preferably 80 to 400 $cm^3/10$ min, even more preferably 100 to 300 $cm^3/10$ min, still more preferably 130 to 250 $cm^3/10$ min, and most preferably 150 to 230 $cm^3/10$ min at 300° C. and 1.2 kg, or a polycarbonate resin having a weight average molecular weight of preferably 5000 to 75000, more preferably 13000 to 32000, even more preferably 14000 to 30000, still more preferably 15000 to 28000, and most preferably 18000 to 27000, the weight average molecular weight being obtained by converting a chromatogram determined by gel permeation chromatography (GPC) into the molecular weight of a standard polystyrene. The MVR value and the molecular weight of a polycarbonate resin can be regulated by adjusting the amount of an end terminator and/or a branching agent.

The methacrylic resin composition according to another embodiment of the present invention comprises the methacrylic resin [A] and a cross-linked rubber. The methacrylic resin composition according to the present invention comprising the methacrylic resin [A] and a cross-linked rubber has high impact resistance, so that a film obtained from the composition does not easily crack, even if it is unstretched, has a high yield, and offers excellent handleability.

[Crosslinked Rubber]

A crosslinked rubber to be used in the present invention is a rubber elastic polymer in which polymeric chains are cross-linked with a structural unit derived from a crosslinkable monomer. Note that the crosslinkable monomer has two or more polymerizable functional groups in one monomer.

Examples of a crosslinkable monomer can include allyl acrylate, allyl methacrylate, 1-acryloxy-3-butene, 1-methacryloxy-3-butene, 1,2-diacryloxy-ethane, 1,2-dimethacryloxy-ethane, 1,2-diacryloxy-propane, 1,3-diacryloxy-propane, 1,4-diacryloxy-butane, 1,3-dimethacryloxy-propane, 1,2-dimethacryloxy-propane, 1,4-dimethacryloxy-butane, triethyleneglycol dimethacrylate, hexanediol dimethacrylate, triethyleneglycol diacrylate, hexanedioldiacrylate, divinylbenzene, 1,4-pentadiene, triallyl isocyanate and the like. These monomers can be used alone or in combination of two or more.

Examples of a crosslinked rubber can include acrylic crosslinked rubber, diene crosslinked rubber and the like. More specific examples thereof can include a copolymerized rubber of an acrylic acid alkyl ester monomer, a crosslinkable monomer and another vinyl monomer, a copolymerized rubber of a conjugated diene monomer, a crosslinkable monomer and another vinyl monomer, a copolymerized rubber of an acrylic acid alkyl ester monomer, a conjugated diene monomer, a crosslinkable monomer and another vinyl monomer and the like.

In the present invention, a crosslinked rubber is preferably contained in the form of particles in the methacrylic resin composition.

Cross-linked rubber particles may be monolayer particles consisting only of a crosslinked rubber or multilayer particles comprising a crosslinked rubber and another polymer. A preferred example of the form of multilayer particles of a crosslinked rubber and another polymer is a form of core-shell particles comprising a core composed of the crosslinked rubber and a shell composed of the other polymer.

Crosslinked rubber particles that are suitably used in the present invention are acrylic multilayer polymer particles. Acrylic multilayer polymer particle comprises a core part and a shell part. The core part comprises a center core and, if needed, at least one layer of inner shell covering the center core approximately concentrically. The shell part comprises one layer of outer shell covering the core part approximately concentrically. The acrylic multilayer polymer particle preferably comprises the center core, the inner shell and the outer shell that are connected without any gap among them.

In acrylic multilayer polymer particles, at least one of the center core and the inner shell comprises a crosslinked rubber polymer (i), and the remainder comprises a polymer (iii).

In a case where at least two of the center core and the inner shell comprise the crosslinked rubber polymer (i), the crosslinked rubber polymer (i) to be contained therein may have the same polymer physical properties, or different polymer physical properties. In a case where the number of reminder portions of the center core and the inner shell is two or more, a polymer (iii) to be contained therein may have the same polymer physical properties, or different polymer physical properties.

The aforementioned crosslinked rubber polymer (i) leastwise comprises a unit derived from an acrylic acid alkyl ester monomer and/or a unit derived from a conjugated diene monomer, and a unit derived from a crosslinkable monomer.

An acrylic acid alkyl ester monomer is preferably an acrylic acid alkyl ester monomer in which the alkyl comprises 1 to 8 of carbon atoms. Examples of an acrylic acid alkyl ester monomer can include methyl acrylate, ethyl acrylate, propyl acrylate, butyl acrylate, 2-ethylhexyl acrylate and the like. These acrylic acid alkyl ester monomers can be used alone or in combination of two or more.

Examples of a conjugated diene monomer can include butadiene and isoprene. These conjugated diene monomers can be used alone or in combination of two or more.

In the crosslinked rubber polymer (i), the amount of a unit derived from an acrylic acid alkyl ester monomer and/or a unit derived from a conjugated diene monomer is preferably not less than 60% by mass, more preferably 70 to 99% by mass, even more preferably 80 to 98% by mass relative to the total mass of the crosslinked rubber polymer (i).

A crosslinkable monomer has two or more polymerizable functional groups in one monomer. Examples of a crosslinkable monomer can include allyl acrylate, allyl methacrylate, 1-acryloxy-3-butene, 1-methacryloxy-3-butene, 1,2-diacryloxy-ethane, 1,2-dimethacryloxy-ethane, 1,2-diacryloxy-propane, 1,3-diacryloxy-propane, 1,4-diacryloxy-butane, 1,3-dimethacryloxy-propane, 1,2-dimethacryloxy-propane, 1,4-dimethacryloxy-butane, triethyleneglycol dimethacrylate, hexanediol dimethacrylate, triethyleneglycoldiacrylate, hexanedioldiacrylate, divinylbenzene, 1,4-pentadiene, triallyl isocyanate and the like. These crosslinkable monomers can be used alone or in combination of two or more.

The amount of a unit derived from a crosslinkable monomer in the crosslinked rubber polymer (i) is preferably 0.05 to 10% by mass, more preferably 0.5 to 7% by mass, and even more preferably 1 to 5% by mass, relative to the total mass of the crosslinked rubber polymer (i).

The crosslinked rubber polymer (i) may have a unit derived from another vinyl monomer. The other vinyl monomer in the crosslinked rubber polymer (i) is not particularly limited, as long as it is co-polymerizable with the aforementioned acrylic acid alkyl ester monomers and crosslinkable monomers. Examples of another vinyl monomer in the crosslinked rubber polymer (i) can include: methacrylic acid ester monomers such as methyl methacrylate, ethyl methacrylate, butyl methacrylate, cyclohexyl methacrylate and the like; aromatic vinyl monomers such as styrene, p-methyl styrene, o-methyl styrene and the like; and maleimide monomers such as N-propyl maleimide, N-cyclohexyl maleimide, N-o-chlorophenyl maleimide and the like. The other vinyl monomers can be used alone or in combination of two or more.

The amount of a unit derived from the other vinyl monomer in the crosslinked rubber polymer (i) is the remainder relative to the total amount of a unit derived from an acrylic acid alkyl ester monomer, a unit derived from a conjugated diene monomer, and a unit derived from a crosslinkable monomer.

The aforementioned polymer (iii) is not particularly limited as long as it is a polymer other than the crosslinked rubber polymer (i), and preferably comprises a unit derived from a methacrylic acid alkyl ester monomer. The polymer (iii) may also contain, as other units, a unit derived from a crosslinkable monomer and/or units derived from other vinyl monomers.

A methacrylic acid alkyl ester monomer to be used for the polymer (iii) is preferably a methacrylic acid alkyl ester monomer in which the alkyl comprises 1 to 8 of carbon atoms. Examples of a methacrylic acid alkyl ester monomer can include methyl methacrylate, ethyl methacrylate, butyl methacrylate and the like. These methacrylic acid alkyl ester monomers can be used alone or in combination of two or more. Methyl methacrylate is preferred among these them.

The amount of a unit derived from a methacrylic acid alkyl ester monomer in the polymer (iii) is preferably 80 to 100% by mass, more preferably 85 to 99% by mass, and even more preferably 90 to 98% by mass.

Examples of a crosslinkable monomer to be used in the polymer (iii) can include the same monomers as those listed as examples of a crosslinkable monomer in the aforementioned crosslinked rubber polymer (i). The amount of a unit derived from a crosslinkable monomer in the polymer (iii) is preferably 0 to 5% by mass, more preferably 0.01 to 3% by mass, and even more preferably 0.02 to 2% by mass.

Another vinyl monomer in the polymer (iii) is not particularly limited, as long as it is co-polymerizable with the aforementioned methacrylic acid alkyl ester monomers and crosslinkable monomers. Examples of another vinyl monomer in the polymer (iii) can include: acrylic ester monomers such as methyl acrylate, ethyl acrylate, propyl acrylate, butyl acrylate, hexyl acrylate, cyclohexyl acrylate, phenyl acrylate, benzyl acrylate, 2-ethylhexyl acrylate and the like; vinyl acetate; aromatic vinyl monomers such as styrene, p-methyl styrene, m-methyl styrene, o-methyl styrene, α-methyl styrene, vinylnaphthalene and the like; nitriles such as acrylonitrile, methacrylonitrile and the like; α,β-unsaturated carboxylic acid such as acrylic acid, methacrylic acid, crotonic acid and the like; and maleimide monomers such as N-ethyl maleimide, N-cyclohexyl maleimide and the like. These can be used alone or in combination of two or more.

The amount of a unit derived from the other vinyl monomer in the polymer (iii) is the remainder relative to the total amount of a unit derived from a methacrylic acid alkyl ester monomer, and a unit derived from a crosslinkable monomer.

Acrylic multilayer polymer particle comprises the outer shell comprising a thermoplastic polymer (ii).

The aforementioned thermoplastic polymer (ii) comprises a unit derived from a methacrylic acid alkyl ester monomer. The thermoplastic polymer (ii) may comprise a unit derived from another vinyl monomer.

A methacrylic acid alkyl ester monomer in the thermoplastic polymer (ii) is preferably a methacrylic acid alkyl ester monomer in which the alkyl comprises 1 to 8 of carbon atoms.

Examples of a methacrylic acid alkyl ester monomer can include methyl methacrylate, butyl methacrylate and the like. These can be used alone or in combination of two or more. Methyl methacrylate is preferred among these.

The amount of a unit derived from a methacrylic acid alkyl ester monomer in the thermoplastic polymer (ii) is preferably not less than 80% by mass, more preferably not less than 85% by mass, and even more preferably not less than 90% by mass.

Examples of another vinyl monomer in the thermoplastic polymer (ii) can include vinyl monomers same as those listed as examples for the above polymer (iii).

The amount of a unit derived from the other vinyl monomer in the thermoplastic polymer (ii) is preferably not more than 20% by mass, more preferably not more than 15% by mass, and even more preferably not more than 10% by mass.

In acrylic multilayer polymer particles, as the constituent of the core part and the shell part, mentioned can be double-layer polymer particles wherein the center core is composed of the crosslinked rubber polymer (i) and the outer shell is composed of the thermoplastic polymer (ii); triple-layer polymer particles wherein the center core is composed of the polymer (iii); the inner shell is composed of the crosslinked rubber polymer (i), and the outer shell is composed of the thermoplastic polymer (ii); triple-layer polymer particles wherein the center core is composed of one type of the crosslinked rubber polymer (i), the inner shell is composed of another type of the crosslinked rubber polymer (i), and the outer shell is composed of the thermoplastic polymer (ii); triple-layer polymer particles wherein the center core is composed of the crosslinked rubber polymer (i), the inner shell is composed of the polymer (iii), and the outer shell is composed of the thermoplastic polymer (ii); quadruple-layer polymer particles wherein the center core is composed of the crosslinked rubber polymer (i), the medial inner shell is composed of the polymer (iii), the lateral inner shell is composed of the crosslinked rubber polymer (i), and the outer shell is composed of the thermoplastic polymer (ii) and the like. Among these, triple-layer polymer particles wherein the center core is composed of the polymer (iii) the inner shell is composed of the crosslinked rubber polymer (i), and the outer shell is composed of the thermoplastic polymer (ii), are preferred.

The triple-layer polymer particles preferably comprise the polymer (iii) for the center core, which is a copolymer of 80 to 99.95% by mass of methyl methacrylate, 0 to 19.95% by mass of an acrylic acid alkyl ester monomer in which the alkyl comprises 1 to 8 carbon atoms and 0.05 to 2% by mass of a crosslinkable monomer; the crosslinked rubber polymer (i) for the inner shell, which is a copolymer of 80 to 98% by mass of an acrylic acid alkyl ester monomer in which the alkyl comprises 1 to 8 carbon atoms, 1 to 19% by mass of an aromatic vinyl monomer and 1 to 5% by mass of a crosslinkable monomer; and the thermoplastic polymer (ii) for the outer shell, which is a copolymer of 80 to 100% by mass of methyl methacrylate and 0 to 20% by mass of an acrylic acid alkyl ester monomer in which the alkyl comprises 1 to 8 carbon atoms.

In view of the transparency of acrylic multilayer polymer particles, a polymer to be contained in each layer is preferably selected so that a difference in refractive index between adjacent layers is preferably less than 0.005, more preferably less than 0.004, and even more preferably less than 0.003.

The content of the outer shell part in acrylic multilayer polymer particles is preferably 10 to 60% by mass, more preferably 15 to 50% by mass, and even more preferably 20 to 40% by mass. The content accounted for by the layer comprising the crosslinked rubber polymer (i) in the core part is preferably 20 to 100% by mass, and more preferably 30 to 70% by mass.

The volume-based mean particle diameter of crosslinked rubber particles to be used in the present invention is preferably 0.02 to 1 µm, more preferably 0.05 to 0.5 µm, and even more preferably 0.1 to 0.3 µm. Using of a crosslinked rubber particle component having such a volume-based mean particle diameter can significantly reduce defects in terms of appearance of the formed product. In addition, a value of the volume-based mean particle diameter in this specification is calculated based on particle size distribution data measured by light scattering method.

Crosslinked rubber particles can be obtained by any manufacturing method. In view of the ease of particle size control and the production of multilayer structures and the like, the emulsion polymerization method, or the seed emulsion polymerization method is preferred. The emulsion polymerization method is capable of manufacturing an emulsion containing polymer particles by emulsifying and polymerizing a predetermined monomer. The seed emulsion polymerization method is capable of manufacturing an emulsion containing a core-shell polymer particle having a seed particle and a shell polymer with which the seed particle is coated approximately concentrically by emulsifying and polymerizing a predetermined monomer to obtain the seed particles and then emulsifying and polymerizing another predetermined monomer in the presence of the seed particles. An emulsion containing a core-shell multilayer polymer particle comprising seed particle and a plurality of shell polymers with which the seed particle is coated approximately concentrically can be manufactured by repeating a step of emulsifying and polymerizing another predetermined monomer in the presence of core-shell polymer particles for desired number of times.

Examples of an emulsifying agent to be used in the emulsion polymerization method can include: anionic emulsifying agents, that is, dialkyl sulfosuccinate such as sodium dioctylsulfosuccinate, sodium dilauryl sulfosuccinate and the like, alkylbenzene sulfonate such as sodium dodecylbenzenesulfonate and the like; and alkyl sulfate such as sodium dodecyl sulfate and the like; nonionic emulsifying agents, that is, polyoxyethylenealkylether, polyoxyethylene nonylphenyl ether and the like; nonionic-anionic emulsifying agents; that is, polyoxyethylene nonylphenyl ether sulfate such as sodium polyoxyethylene nonylphenyl ether sulfate and the like, polyoxyethylenealkyl ether sulfate such as sodium polyoxyethylenealkyl ether sulfate and the like, and alkyl ether carboxylate such as sodium polyoxyethylenetridecyl ether acetate and the like. These can be used alone or in combination of two or more. Note that the average number of repeating ethyleneoxide units in compounds listed as examples of nonionic emulsifying agents and nonionic-anionic emulsifying agents is preferably not more than 30, more preferably not more than 20, and even more preferably not more than 10, in order to prevent the foaming property of an emulsifying agent from extremely increasing.

There is no particular limitation for a polymerization initiator to be used for emulsion polymerization. Examples thereof can include: persulfate initiators such as potassium persulfate, ammonium persulfate and the like; and redox initiators such as persulfoxylate/organic peroxide, persulfate/sulfite and the like.

Crosslinked rubber particles can be separated and obtained from an emulsion obtained by emulsion polymerization by a known method such as a salting-out coagulation method, a freeze coagulation method, a spray drying method and the like. Among these, since impurities contained in crosslinked rubber particles can be easily removed by washing with water, the salting-out coagulation method and the freeze coagulation method are preferred, and the freeze coagulation method is more preferred. The freeze coagulation method does not involve the use of a flocculant, therefore an acrylic resin film excellent in water resistance can be obtained more easily.

In addition, it is preferred to filter an emulsion using a wire net or the like having a mesh size of not more than 50 µm before the step of coagulation, since foreign matter mixed into the emulsion can be removed.

In view of the ease of the uniform dispersion of crosslinked rubber particles upon melt-kneading of crosslinked rubber particles and the methacrylic resin [A], crosslinked rubber particles are preferably obtained in the form of an aggregate of preferably not more than 1000 µm, and more preferably not more than 500 µm. In addition, the form of an aggregate of crosslinked rubber particles is not particularly limited and may be a pellet in which the particles are fused to each other in the shell part, or may be a powdery form and/or a granular form.

The amount of crosslinked rubber to be contained in the methacrylic resin composition according to an embodiment of the present invention is preferably 5 to 30 parts by mass, more preferably 10 to 25 parts by mass, and even more preferably 15 to 20 parts by mass, relative to 100 parts by mass of the methacrylic resin [A].

When crosslinked rubber particles are contained in the methacrylic resin composition of the present invention, dispersion-assisting particles can be added to the methacrylic resin composition, so that crosslinked rubber particles can be dispersed uniformly one by one without agglomerating to each other because of agglutination or the like. Examples of dispersion-assisting particles can include methacrylic resin particles and the like. The dispersion-assisting particles preferably have a mean particle diameter lower than that of crosslinked rubber particles. Specifically, the dispersion-assisting particles have a volume-based mean particle diameter of preferably 0.04 to 0.12 µm, and more preferably 0.05 to 0.1 µm.

In view of dispersion effects and the like, the amount of dispersion-assisting particles is preferably 0/100 to 60/40, more preferably 10/90 to 50/50, and even more preferably 20/80 to 40/60 in the mass ratio relative to crosslinked rubber particles.

The methacrylic resin composition according to another embodiment of the present invention comprises the methacrylic resin [A] and a phenoxy resin. The methacrylic resin composition according to the present invention comprising the methacrylic resin [A] and a phenoxy resin can modulate the phase difference, and the thermal decomposition at the time of forming the resin composition can be suppressed to make it possible to form at a high temperature. Moreover, a formed article comprising the methacrylic resin composition according to the present invention comprising the methacrylic resin [A] and a phenoxy resin has good adhesiveness and thus can be suitably used for laminated films, for example.

[Phenoxy Resin]

The amount of a phenoxy resin to be used in the present invention is preferably 1 to 10 parts by mass, more preferably 2 to 7 parts by mass, and even more preferably 3 to 6 parts by mass relative to 100 parts by mass of the methacrylic resin [A], in view of the ease of decreasing the phase difference of the formed article. Furthermore, in view of the suppression of thermal decomposition at the time of forming, the amount of the phenoxy resin is preferably 0.1 to 5 parts by mass, more preferably 0.2 to 4 parts by mass, and even more preferably 0.5 to 3 parts by mass, relative to 100 parts by mass of the methacrylic resin [A].

The phenoxy resin is a thermoplastic polyhydroxy polyether resin. The phenoxy resin contains at least one structural unit represented by formula (1), for example, and also contains not less than 50% by mass of the structural unit represented by formula (1).

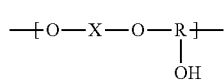

(1)

In formula (1), X is a divalent group containing at least one benzene ring, and R is a linear or branched alkylene group having 1 to 6 carbon atoms. Structural units represented by formula (1) may be connected in any form of random connection, alternate connection, and block connection.

The phenoxy resin preferably contains 10 to 1000, more preferably 15 to 500, and even more preferably 30 to 300 structural units represented by formula (1).

The phenoxy resin preferably has no epoxy group at its terminuses. Using of the phenoxy resin having no epoxy group at the terminuses can easily provide film with few gel defects.

The number average molecular weight of the phenoxy resin is preferably 3000 to 2000000, more preferably 5000 to 100000, and most preferably 10000 to 50000. With the number average molecular weight within the range, a methacrylic resin composition having high thermal resistance and high strength can be obtained.

The phenoxy resin has a glass transition temperature of preferably not less than 80° C., more preferably not less than 90° C., and most preferably not less than 95° C. When the phenoxy resin has an excessively low glass transition temperature, the resulting methacrylic resin composition tends to have low thermal resistance. The upper limit of the glass transition temperature of the phenoxy resin is not particularly limited, and is preferably 150° C. When the phenoxy resin has an excessively high glass transition temperature, a formed article made of the resulting methacrylic resin composition tends to be brittle.

The phenoxy resin can be obtained by, for example, condensation reaction of a divalent phenol compound and epihalohydrin, or polyaddition reaction of a divalent phenol compound and a difunctional epoxy resin. These reactions can be performed in a solvent or in the absence of solvent.

Examples of the divalent phenol compound to be used for manufacturing the phenoxy resin can include hydroquinone, resorcin, 4,4-dihydroxybiphenyl, 4,4'-dihydroxy diphenyl ketone, 2,2-bis(4-hydroxyphenyl)propane, 1,1-bis(4-hydroxyphenyl)cyclohexane, 1,1-bis(4-hydroxyphenyl)-3,3,5-trimethylcyclohexane, bis(4-hydroxyphenyl)methane, 1,1-bis(4-hydroxyphenyl)ethane, 2,2-bis(4-hydroxyphenyl) butane, 1,1-bis(4-hydroxyphenyl)-1-phenylethane, bis(4-hydroxyphenyl)diphenylmethane, 2,2-bis(4-hydroxy-3-methylphenyl)propane, 2,2-bis(3-phenyl-4-hydroxyphenyl) propane, 2,2-bis(4-hydroxy-3-tert-butylphenyl)propane, 1,3-bis(2-(4-hydroxyphenyl)propyl)benzene, 1,4-bis(2-(4-hydroxyphenyl)propyl)benzene, 2,2-bis(4-hydroxyphenyl)-1,1,1-3,3,3-hexafluoropropane, 9,9'-bis(4-hydroxyphenyl) fluorene and the like. Among these, 4,4-dihydroxybiphenyl, 4,4'-dihydroxy diphenyl ketone, 2,2-bis(4-hydroxyphenyl) propane, or 9,9'-bis(4-hydroxyphenyl) fluorene is preferred in view of physical properties and cost.

Examples of difunctional epoxy resins to be used for manufacturing the phenoxy resin can include epoxy oligomers obtained by condensation reaction of the aforementioned divalent phenol compound and epihalohydrin, such as hydroquinone diglycidyl ether, resorcin diglycidyl ether, bisphenol S-type epoxy resin, bisphenol A-type epoxy resin, bisphenol F-type epoxy resin, methylhydroquinone diglycidyl ether, chlorohydroquinone diglycidyl ether, 4,4'-dihydroxy diphenyl oxide diglycidyl ether, 2,6-dihydroxynaphthalene diglycidyl ether, dichlorobisphenol A diglycidyl ether, tetrabromobisphenol A-type epoxy resin, 9,9'-bis(4)-hydroxyphenyl)fluorene diglycidyl ether and the like. In particular, in view of physical properties and cost, bisphenol A-type epoxy resin, bisphenol S-type epoxy resin, hydroquinone diglycidyl ether, bisphenol F-type epoxy resin, tetrabromobisphenol A-type epoxy resin, or 9,9'-bis(4)-hydroxyphenyl)fluorene diglycidyl ether is preferred.

As a solvent that can be used for manufacturing the phenoxy resin, an aprotic organic solvent such as methyl ethyl ketone, dioxane, tetrahydrofuran, acetophenone, N-methyl pyrrolidone, dimethyl sulfoxide, N,N-dimethylacetamide, sulfolane, or the like can be suitably used.

A catalyst that can be used for manufacturing the phenoxy resin is a conventionally known polymerization catalyst. Examples of a polymerization catalyst that can be suitably used herein can include an alkali metal hydroxide, a tertiary amine compound, a quaternary ammonium compound, a tertiary phosphine compound, and a quaternary phosphonium compound.

In the phenoxy resin preferably used in the present invention, X in formula (1) is preferably a divalent group derived from compounds shown in formulae (2) to (8).

Note that the positions of two bonding arms composing a divalent group are not particularly limited, as long as the positions are chemically possible. X in formula (1) is preferably a divalent group having bonding arms resulting from the abstraction of two hydrogen atoms from a benzene ring in the compounds shown in formulae (2) to (8). In particular, X in formula (1) is preferably a divalent group having bonding arms resulting from the abstraction of one hydrogen atom from each of two benzene rings in the compounds shown in formulae (3) to (8).

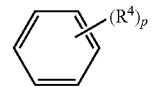

(2)

In formula (2), $R^4$ is a hydrogen atom, a linear or branched alkyl group having 1 to 6 of carbon atoms, or a linear or branched alkenyl group having 2 to 6 of carbon atoms, and p is any one of integers of 1 to 4.

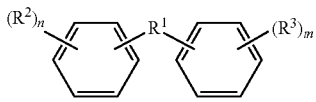

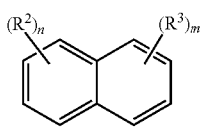

In formula (3), $R^1$ is a single bond, a linear or branched alkylene group having 1 to 6 of carbon atoms, a cycloalkylene group having 3 to 20 of carbon atoms, or a cycloalkylidene group having 3 to 20 of carbon atoms.

In formulae (3) and (4), $R^2$ and $R^3$ are each independently a hydrogen atom, a linear or branched alkyl group having 1 to 6 of carbon atoms, or a linear or branched alkenyl group having 2 to 6 of carbon atoms, and n and m are each independently any one of integers of 1 to 4.

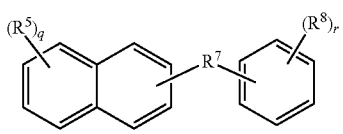

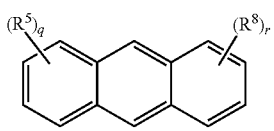

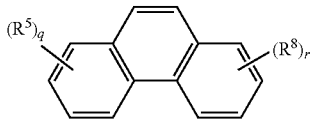

In formulae (5) and (6), $R^6$ and $R^7$ are each independently a single bond, a linear or branched alkylene group having 1 to 6 of carbon atoms, a cycloalkylene group having 3 to 20 of carbon atoms, or a cycloalkylidene group having 3 to 20 of carbon atoms.

In formulae (5), (6), (7) and (8), $R^5$ and $R^8$ are each independently a hydrogen atom, a linear or branched alkyl group having 1 to 6 of carbon atoms, or a linear or branched alkenyl group having 2 to 6 of carbon atoms, and q and r are each independently any one of integers of 1 to 4.

In formula (1), X may be a divalent group derived from a compound resulting from a condensation of a plurality of benzene rings with an alicyclic or heterocyclic ring. For instance, mentioned can be a divalent group derived from a compound having a fluorene structure or a carbazole structure.

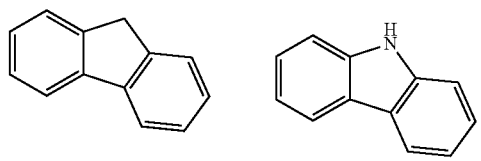

As the divalent group derived from the compounds represented by the above formulae (2) to (8), mentioned can be the following examples. Note that these examples are not intended to limit "X" in the invention of the present application.

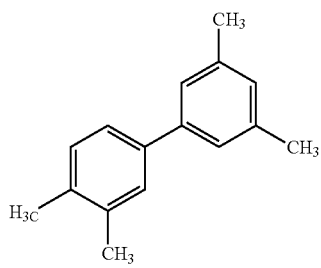

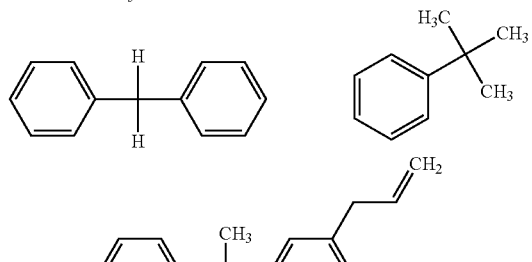

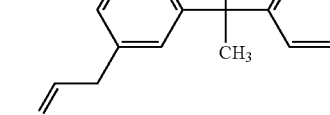

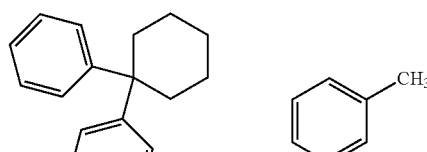

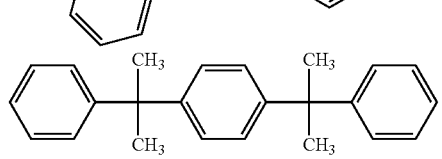

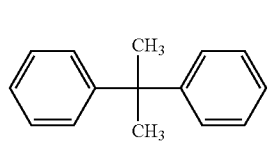

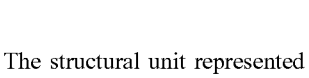

The structural unit represented by formula (1) is preferably a structural unit represented by formula (9) or (10), and more preferably a structural unit represented by formula (11). A preferred embodiment of the phenoxy resin preferably contains 10 to 1000 such structural units.

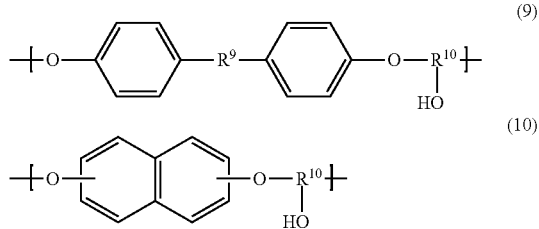

(9)

(10)

In formula (9), $R^9$ is a single bond, a linear or branched alkylene group having 1 to 6 of carbon atoms, a cycloalkylene group having 3 to 20 of carbon atoms, or a cycloalkylidene group having 3 to 20 of carbon atoms.

In formula (9) or (10), $R^{10}$ is a linear or branched alkylene group having 1 to 6 of carbon atoms.

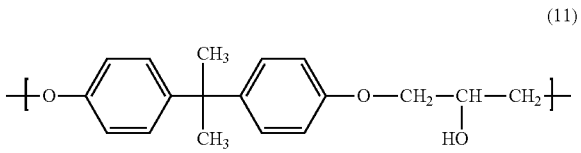

(11)

As these phenoxy resins, for example, YP-50 and YP-50S produced by Nippon Steel & Sumikin Chemical, jER series produced by Mitsubishi Chemical Corporation, PKFE, and PKHJ being phenoxy resins produced by InChem Co. and the like can be used.

The methacrylic resin composition of the present invention may contain a component other than the methacrylic resin [A], the polycarbonate resin, the crosslinked rubber and the phenoxy resin. Examples of such other component can include polymers other than the methacrylic resin [A], the polycarbonate resin, the crosslinked rubber and the phenoxy resin, and additives such as a filler, crosslinked rubber particles, an antioxidizing agent, a heat deterioration inhibitor, an ultraviolet absorber, a light stabilizer, a lubricant, a parting agent, a polymer processing aid, an antistatic agent, a flame retardant, dyes and pigments, a light diffusing agent, an organic dye, a delustering agent, an impact resistance modifier, a fluorescent material and the like.

Examples of the other polymers can include polyolefin resins such as polyethylene, polypropylene, polybutene-1, poly-4-methylpentene-1, polynorbornene and the like; ethylene ionomer; styrene resins such as polystyrene, styrene-maleic anhydride copolymer, high impact polystyrene, AS resin, ABS resin, AES resin, AAS resin, ACS resin, MBS resin and the like; methyl methacrylate polymer other than the methacrylic resin [A]; methyl methacrylate-styrene copolymer; polyester resins such as polyethylene terephthalate, polybutylene terephthalate and the like; polyamides such as Nylon 6, Nylon 66, polyamide elastomers and the like; polyvinyl chloride, polyvinylidene chloride, polyvinyl alcohol, polyvinyl butyral, polyvinyl acetal, ethylene-vinyl alcohol copolymer, polyacetal, polyvinylidene fluoride, polyurethane, modified polyphenylene ether, polyphenylene sulfide, silicone modified resins; acrylic rubber, acrylic thermoplastic elastomers, silicone rubber; styrene thermoplastic elastomers such as SEPS, SEBS, SIS and the like; and olefin rubber such as IR, EPR, EPDM and the like.

Examples of a filler can include calcium carbonate, talc, carbon black, titanium oxide, silica, clay, barium sulfate, magnesium carbonate and the like. The amount of the filler that may be contained in the methacrylic resin composition of the present invention is preferably not more than 3% by mass, and more preferably not more than 1.5% by mass.

An antioxidizing agent alone has an effect for preventing oxidation deterioration of a resin in the presence of oxygen. Examples thereof can include a phosphorus antioxidizing agent, a hindered phenol antioxidizing agent, a thioether antioxidizing agent and the like. These antioxidizing agents may be used alone or in combination of two or more. Among these, in view of the effect for preventing deterioration of an optical property due to coloring, a phosphorus antioxidizing agent and a hindered phenol antioxidizing agent are preferred, a combination use of a phosphorus antioxidizing agent and a hindered phenol antioxidizing agent are more preferred.

In a case where a phosphorus antioxidizing agent and a hindered phenol antioxidizing agent are used in combination, the mass ratio of phosphorus antioxidizing agent/hindered phenol antioxidizing agent is preferably 1/5 to 2/1, more preferably 1/2 to 1/1.

Examples of a phosphorus antioxidizing agent can include 2,2-methylenebis(4,6-di-t-butylphenyl)octyl phosphite (ADEKA Corp.; product name: ADK STAB HP-10), tris(2, 4-di-t-butylphenyl)phosphite (BASF A.G.; product name: IRGAFOS168), and 3,9-bis(2,6-di-tert-butyl-4-methylphenoxy)-2,4,8,10-tetraoxa-3,9-diphosphaspiro[5.5]undecane (ADEKA Corp: product name: ADK STAB PEP-36).

Examples of a hindered phenol antioxidizing agent can include pentaerythrityl-tetrakis[3-(3,5-di-t-butyl-4-hydroxyphenyl)propionate] (BASF A.G.; product name: IRGANOX1010), octadecyl-3-(3,5-di-t-butyl-4-hydroxyphenyl)propionate (BASF A.G.; product name: IRGANOX1076) and the like.

A thermal deterioration inhibitor can prevent thermal deterioration of a resin by scavenging a polymer radical generated when the resin is exposed to high temperature essentially in the absence of oxygen. Examples of the thermal deterioration inhibitor can include 2-t-butyl-6-(3'-t-butyl-5'-methyl-hydroxybenzyl)-4-methylphenyl acrylate (Sumitomo Chemical Co., Ltd.; product name: Sumilizer GM), 2,4-di-t-amyl-6-(3',5'-di-t-amyl-2'-hydroxy-α-methyl benzyl)phenyl acrylate (Sumitomo Chemical Co., Ltd.; product name: Sumilizer GS) and the like.

An ultraviolet absorber is a compound capable of absorbing ultraviolet light. The ultraviolet absorber is a compound which is said to have a function for mainly converting light energy into thermal energy. Examples of the ultraviolet absorber can include benzophenones, benzotriazols, triazines, benzoates, salicylates, cyanoacrylates, oxalic anilides, malonic esters, formamidines and the like. These may be used alone or in combination of two or more. Among these, preferred are benzotriazols, triazines or an ultraviolet absorber having a maximum molar extinction coefficient $\varepsilon_{max}$ at wavelengths of 380 to 450 nm of not more than 1200 $dm^3 \cdot mol^{-1} cm^{-1}$.

Benzotriazols, which have a strong effect for preventing optical property deterioration such as coloring due to exposure to ultraviolet light, are preferably used as an ultraviolet absorber when such a property is required for the methacrylic resin composition of the present invention. Examples of benzotriazols can include 2-(2H-benzotriazol-2-yl)-4-(1, 1,3,3-tetramethylbutyl)phenol (BASF A.G.; product name: TINUVIN329), 2-(2H-benzotriazol-2-yl)-4,6-bis(1-methyl-1-phenylethyl)phenol (BASF A.G.; product name TINUVIN234), 2,2'-methylenebis[6-(2H-benzotriazol-2-yl)-4-tert-octylphenol] (ADEKA Corp.; LA-31) and the like.

Further, the ultraviolet absorber having a maximum molar extinction coefficient $\varepsilon_{max}$ in wavelengths of 380 to 450 nm of not more than 1200 dm$^3$·mol$^{-1}$ cm$^{-1}$ can suppress yellowish coloring of the resulting formed article. Examples of such ultraviolet absorber can include 2-ethyl-2'-ethoxy-oxalanilide (Clariant Japan K.K.; product name: Sanduvor VSU) and the like.

Among these ultraviolet absorbers, benzotriazols are preferably used in view of that deterioration of a resin due to exposure to ultraviolet light can be suppressed.

Further, the triazine ultraviolet absorbers are preferably used to efficiently absorb light with a wavelength around 380 nm. Examples of such ultraviolet absorber can include 2,4,6-tris(2-hydroxy-4-hexyloxy-3-methylphenyl)-1,3,5-triazine (ADEKA Corp.; LA-F70), analogs thereof such as hydroxyphenyl triazine ultraviolet absorbers (BASF A.G.; TINUVIN477 and TINUVIN460) and the like.

In order to particularly effectively absorb light with wavelengths of 380 nm to 400 nm, a metal complex having a ligand with a heterocyclic structure as disclosed in WO2011/089794 A1, WO2012/124395 A1, JP2012-012476 A, JP2013-023461 A, JP2013-112790 A, JP2013-194037 A, JP2014-62228 A, JP2014-88542 A, JP2014-88543 A, and the like (for example, a compound having a structure represented by formula (A) and the like) is preferably used as an ultraviolet absorber.

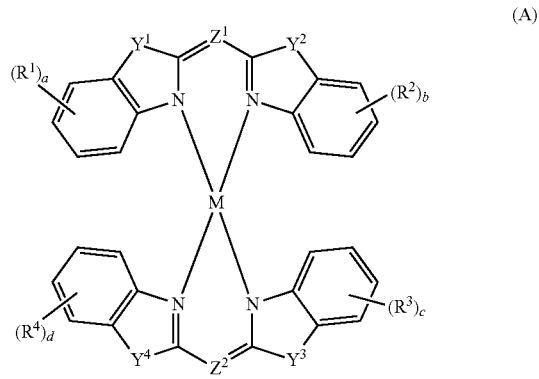

(A)

[In formula (A), M is a metal atom;
$Y^1$, $Y^2$, $Y^3$ and $Y^4$ are each independently a divalent group other than carbon atoms such as oxygen atom, sulfur atom, NH, NR$^5$, and the like; R$^5$ is each independently a substituent such as an alkyl group, an aryl group, a heteroaryl group, a heteroaralkyl group, an aralkyl group and the like; the substituent may have another substituent;
$Z^1$ and $Z^2$ are each independently a trivalent group such as nitrogen atom, CH, CR$^6$, and the like; R$^6$ is each independently a substituent such as an alkyl group, an aryl group, a heteroaryl group, a heteroaralkyl group, an aralkyl group and the like; the substituent may further have another substituent;
$R^1$, $R^2$, $R^3$, and $R^4$ are each independently a substituent such as a hydrogen atom, an alkyl group, a hydroxyl group, a carboxyl group, an alkoxyl group, a halogeno group, an alkylsulfonyl group, a monopholinosulfonyl group, a piperidinosulfonyl group, thiomorpholinosulfonyl group, a piperadinosulfonyl group and the like; the substituent may further have another substituent; and a, b, c, and d each denotes the number of R$^1$, R$^2$, R$^3$, and R$^4$ and is any one of integers of 1 to 4].

Examples of the ligand having heterocyclic structure include 2,2'-iminobisbenzothiazole, 2-(2-benzothiazolylamino) benzoxazole, 2-(2-benzothiazolylamino) benzimidazole, (2-benzothiazolyl) (2-benzoimidazolyl)methane, bis (2-benzoxazolyl)methane, bis(2-benzothiazolyl)methane, bis[2-(N-substituted)benzoimidazolyl]methane, and derivatives thereof. As the central metal in such a metal complex, copper, nickel, cobalt, or zinc is preferably used. In order to use these metal complexes as ultraviolet absorbers, the metal complexes are preferably dispersed in medium such as a low molecular weight compound or a polymer. The amount of the metal complex to be added preferably is 0.01 part by mass to 5 parts by mass, and more preferably 0.1 to 2 parts by mass relative to 100 parts by mass of the film of the present invention. The aforementioned metal complex has a high molar extinction coefficient at a wavelength of 380 nm to 400 nm, the amount of the metal complex to be added so as to obtain a sufficient effect of ultraviolet absorption is low. A low amount of the metal complex to be added can prevent the appearance of a formed article from becoming worse due to bleed-out or the like. Furthermore, the aforementioned metal complex has high thermal resistance, resulting in less deterioration and decomposition upon forming and processing. Moreover, the aforementioned metal complex has high light resistance, therefore the performance of ultraviolet absorption can be maintained for a long time period.

Additionally, the maximum molar extinction coefficient $\varepsilon_{max}$ of an ultraviolet absorber is measured as follows. Into 1 L of cyclohexane, 10.00 mg of an ultraviolet absorber is added, and allowed to dissolve until no undissolved materials are visually observed. This solution is transferred into a 1 cm×1 cm×3 cm quartz glass cell, and the absorbance in the wavelengths of 380 to 450 nm is measured with a Hitachi U-3410 spectrophotometer. The maximum molar extinction coefficient $\varepsilon_{max}$ is computed by the following expression using the molecular weight ($M_{UV}$) of an ultraviolet absorber and the maximum value (Amax) of the measured absorbance.

$$\varepsilon_{max}=[A_{max}/(10\times10^{-3})]\times M_{UV}$$

A light stabilizer is a compound which is said to have a function for scavenging a radical mainly generated by light oxidation. Examples of a suitable light stabilizer can include hindered amines such as a compound having a 2,2,6,6-tetraalkylpiperidine backbone and the like.

Examples of a lubricant can include stearic acid, behenic acid, stearoamide acid, methylenebisstearoamide, triglyceride hydroxysteariate, paraffin wax, ketone wax, octyl alcohol, hardened oil and the like.

Examples of a parting agent can include higher alcohols such as cetyl alcohol, stearyl alcohol and the like; glycerin higher fatty acid esters such as stearic acid monoglyceride, stearic acid diglyceride and the like. In the present invention, higher alcohols and glycerin fatty acid monoesters are preferably used in combination as a parting agent. In a case where higher alcohols and glycerin fatty acid monoesters are used in combination, there is no particular limitation for their ratio, but the used amount of higher alcohols/the used amount of glycerin fatty acid monoesters is preferably 2.5/1 to 3.5/1, more preferably 2.8/1 to 3.2/1 in the mass ratio.

As a polymer processing aid, used are polymer particles (uncrosslinked rubber particles) having a particle diameter of 0.05 to 0.5 μm which can be manufactured usually by the emulsion polymerization method. These polymer particles may be monolayer particles comprising a polymer of a single composition ratio and single limiting viscosity, or may be multilayer particles comprising two or more types of polymers differing in composition ratio or limiting viscosity. Among these, two-layered particles having an inner layer comprising a polymer with a low limiting viscosity and an outer layer comprising a polymer with a high limiting viscosity of not less than 5 dl/g are preferably mentioned. A polymer processing aid preferably has a limiting viscosity of 3 to 6 dl/g. In a case where the limiting viscosity is extremely small, the effect for improving formability tends to be low. In a case where the limiting viscosity is extremely large, the forming processability of a methacrylic resin composition tends to be reduced. Specifically, As the polymer processing aid, mentioned are Metablen-P series from Mitsubishi Rayon Co., Ltd., Paraloid series from Dow Chemical Company and Kureha Chemical Industry Co., Ltd. The amount of a polymer processing aid contained in the film of the present invention is preferably not less than 0.1 part by mass and not more than 5 parts by mass relative to an acrylic resin. The amount of not more than 0.1 part by mass will not provide good processing properties while the amount of not less than 5 parts by mass will cause problems such as deteriorated surface properties.

As an organic dye, preferably used is a compound having a function for converting ultraviolet light into visible light.

Examples of a light diffusing agent and a delustering agent can include glass fine particles, polysiloxane cross-linked fine particles, cross-linked polymer fine particles, talc, calcium carbonate, barium sulfate and the like.

Examples of a fluorescent material can include a fluorescent pigment, a fluorescent dye, a fluorescent white dye, a fluorescent whitening agent, a fluorescent bleaching agent and the like.

The total amount of an antioxidizing agent, a heat deterioration inhibitor, an ultraviolet absorber, an infrared absorber, a light stabilizer, a lubricant, a parting agent, a polymer processing aid, an antistatic agent, a flame retardant, dyes and pigments, a light diffusing agent, an organic dye, a delustering agent, an impact resistance modifier and a fluorescent material which can be contained in the methacrylic resin composition of the present invention is preferably not more than 7% by mass, more preferably not more than 5% by mass, and even more preferably not more than 4% by mass.

The methacrylic resin composition of the present invention comprising the above components has a molecular weight $M_C$ of usually not less than 30 thousand and not more than 100 thousand, preferably not less than 40 thousand and not more than 95 thousand, and more preferably not less than 50 thousand and not more than 90 thousand in terms of polystyrene corresponding to the retention time having the maximum strength in a chromatogram obtained by gel permeation chromatography.

The methacrylic resin composition of the present invention has the area of a region enclosed by an approximate curve that is obtained by fitting the data having the strength of not less than 70% of the value of the maximum strength in a chromatogram obtained by gel permeation chromatography to the Gaussian function by the method of nonlinear least squares, and the base line, wherein the area usually accounts for 45 to 80%, and preferably 50 to 79% of the area of a region enclosed by the chromatogram obtained by gel permeation chromatography and the base line.

The methacrylic resin composition of the present invention has the ratio $Mw_{gC}/Mn_{gC}$ of the weight average molecular weight $Mw_{gC}$ to the number average molecular weight $Mn_{gC}$ of generally not less than 1.01 and not more than 1.20, and preferably not less than 1.02 and not more than 1.10 in terms of polystyrene computed based on the approximate curve obtained by the aforementioned fitting.

Furthermore, the methacrylic resin composition has the weight average molecular weight $Mw_C$ of preferably 50000 to 150000, more preferably 52000 to 120000, and even more preferably 55000 to 100000 in terms of polystyrene computed based on the chromatogram obtained by gel permeation chromatography.

The methacrylic resin composition of the present invention has the ratio $Mw_C/Mn_C$ of the weight average molecular weight $Mw_C$ to the number average molecular weight $Mn_C$ of preferably not less than 1.3 and not more than 3.0, and preferably not less than 1.4 and not more than 2.7 in terms of polystyrene computed based on the chromatogram obtained by gel permeation chromatography.

The methacrylic resin composition of the present invention has a lower limit of a triad syndiotacticity (rr) of preferably 58%, more preferably 59%, and even more preferably 60%. In view of film formability, the methacrylic resin composition has the upper limit of a triad syndiotacticity (rr) of preferably 99%, more preferably 85%, even more preferably 77%, still more preferably 65%, and most preferably 64%.

Note that the triad syndiotacticity (rr) of the methacrylic resin composition be defined by directly measuring a methacrylic resin composition without extracting a methacrylic resin from the methacrylic resin composition according to the method in the examples.

The melt flow rate as determined by measuring the methacrylic resin composition of the present invention under the conditions of 230° C. and a load of 3.8 kg is preferably not less than 0.1 g/10 min, more preferably 0.2 to 30 g/10 min, even more preferably 0.5 to 20 g/10 min, and most preferably 1.0 to 10 g/10 min.

Further, the methacrylic resin composition of the present invention has a glass transition temperature of preferably not less than 120° C., more preferably not less than 123° C., even more preferably not less than 124° C. There is no particular limitation for the upper limit of the glass transition temperature of the methacrylic resin [A], but it is preferably 130° C.

The methacrylic resin composition of the present invention is not particularly limited by the manufacturing methods thereof. For example, the methacrylic resin composition of the present invention can be manufactured by melt-kneading the methacrylic resin [I], the methacrylic resin [II] and another polymer such as the polycarbonate resin, the cross-linked rubber and the phenoxy resin, melt-kneading the methacrylic resin [A] and another polymer such as the polycarbonate resin, the crosslinked rubber, and the phenoxy resin and the like. Melt-kneading can be performed using, for example, a melt-kneading machines such as a kneader ruder, an extruder, a mixing roll, a Banbury mixer and the like. The temperature at the time of kneading can be appropriately adjusted depending on the softening temperatures of the methacrylic resin [I], the methacrylic resin [II] and the other polymer, but kneading is usually performed at a temperature within the range of 150° C. to 300° C. Further, a shear rate at the time of kneading can be adjusted within the range of 10 to 5000 sec$^{-1}$. Moreover, in a case where a methacrylic resin is melt-kneaded with the polycarbonate resin, melt-kneading is preferably performed under the conditions where the relative viscosity ($\eta B/\eta A$) of the melt viscosity ($\eta A$) of the methacrylic resin [I], the methacrylic resin [II] or a resin composition thereof and the melt viscosity ($\eta B$) of the polycarbonate resin is not more than 1.0.

As another method for manufacturing a methacrylic resin composition, mentioned is a method for manufacturing a methacrylic resin composition, which involves polymerizing a monomer that is a raw material of the methacrylic resin [II] in the presence of the methacrylic resin [I] and another polymer. Such polymerization can be performed as the polymerization method for manufacturing the methacrylic resin [II]. In the case of the manufacturing method comprising polymerizing a monomer which is a raw material of the methacrylic resin [II] in the presence of the methacrylic resin [I] and the other polymer, the heat history for the methacrylic resins is shorter than that in the case of the manufacturing method in which the methacrylic resin [I], the methacrylic resin [II] and the other polymer are melt-kneaded. Therefore, the thermal decomposition of the methacrylic resins may be suppressed, and a formed article having less coloring and less foreign substances can easily be obtained.

The methacrylic resin composition of the present invention can be formed into a pellet and the like in order to improve the convenience at the time of storage, transportation or forming.

The formed article of the present invention comprises the methacrylic resin [A] or the methacrylic resin composition according to the present invention. There is no particular limitation for a manufacturing method of the formed article of the present invention. Examples of the manufacturing method can include the melt-forming methods such as the T-die methods (e.g., the lamination method, the co-extruding method and the like), the inflation methods (e.g., co-extrusion method), the compression molding method, the blow molding method, the calendar molding method, the vacuum molding method, the injection molding methods (e.g., the insert molding method, the two-color method, the press method, the core back method, the sandwich method and the like), and the solution casting methods. Among these, The T-die method, the inflation method or the injection molding method is preferred in view of high productivity and cost. There is no limitation for the type of a formed article, but a film (a planar formed article with a thickness of not less than 5 μm and not more than 250 μm) and a sheet (a planar formed article with a thickness of more than 250 μm) can be preferably mentioned. Among these, a film is particularly preferred.

A film as one embodiment of the formed article of the present invention can be manufactured by the solution cast method, the melt casting method, the extrusion method, the inflation molding method, the blow molding method and the like. Among these, the extrusion method is preferred in view of that a film having excellent transparency, improved toughness, excellent handling property and an excellent balance of toughness, surface hardness and stiffness can be obtained. The temperature of a methacrylic resin composition discharged from an extruder is set at preferably 160 to 270° C., more preferably 220 to 260° C.

Among the extrusion methods, in view of that a film with good surface smoothness, good specular gloss and a low haze can be obtained, preferred is a method comprising extruding a methacrylic resin composition through a T-die in a molten state, and then sandwiching it between two or more mirrored rolls or mirrored belts for forming.

Mirrored rolls or mirrored belts are preferably made of a metal. The linear pressure between a pair of mirrored rolls or mirrored belts is preferably not less than 10 N/mm, and more preferably not less than 30 N/mm.

Further, the temperatures of the surfaces of mirrored rolls or mirrored belts are both preferably not more than 130° C.

Moreover, in a pair of mirrored rolls or mirrored belts, the surface temperature of at least one is preferably not less than 60° C. With the surface temperature set at such a level, a methacrylic resin composition discharged from an extruder can be cooled at a rate faster than natural spontaneous cooling, and therefore a film having excellent surface smoothness and a low haze can easily be manufactured. The thickness of an unstretched film obtained by extrusion method is preferably 10 to 300 μm. The haze of the film is preferably not more than 0.5%, and more preferably not more than 0.3% at a thickness of 100 μm.

Stretching treatment may be performed for the methacrylic resin [A] or the methacrylic resin composition according to the present invention formed into a film. Stretching treatment can enhance mechanical strength, and a film more resistant to cracking can be obtained. Examples of stretching methods can include, but are not particularly limited to, the simultaneous biaxial stretching method, the sequential biaxial stretching method, the tubular stretching method and the like. In view of that a film having a high strength which can be uniformly stretched can be obtained, the lower limit of a temperature at the time of stretching is 10° C. higher than the glass transition temperature of the methacrylic resin [A] and the methacrylic resin composition, and the upper limit of a temperature at the time of stretching is 40° C. higher than the glass transition temperature of the methacrylic resin [A] and the methacrylic resin composition. Stretching is usually performed at a rate of 100 to 5000%/min. A film with less thermal contraction can be obtained by performing heat setting after stretching. The thickness of a film after stretching is preferably 10 to 200 μm.

A functional layer may be provided on a surface of a film as one embodiment of the formed article of the present invention. Examples of a functional layer can include a hard-coat layer, an anti-glare layer, an antireflective layer, an anti-sticking layer, a diffusion layer, a glare-proof layer, an antistatic layer, an antifouling layer, a slipping layer such as fine particles, and the like.

An adhesive layer may be provided on a surface of a film as one embodiment of the formed article of the present invention. As an adhesive in the adhesive layer, for example, an aqueous adhesive, a solvent adhesive, a hot melt adhesive, an active energy ray-curable adhesive and the like can be used. Among these, an aqueous adhesive and an active energy ray-curable adhesive are suitable.

Examples of an aqueous adhesive can include, but not particularly limited to, vinyl polymer adhesive, gelatin adhesive, vinyl latex adhesive, polyurethane adhesive, isocyanate adhesive, polyester adhesive, epoxy adhesive and the like. To these aqueous adhesives, cross-linking agents and other additives, catalysts such as acid can also be blended, if desired. As the aforementioned aqueous adhesive, an adhesive containing a vinyl polymer is preferably used, and as the vinyl polymer, a polyvinyl alcohol resin is preferred. Further, a water-soluble cross-linking agent such as boric acid, borax, glutaraldehyde, melamine, oxalic acid and the like may be contained in a polyvinyl alcohol resin. In particular, in a case where a polyvinyl alcohol polymer film is used as a polarizer, an adhesive containing a polyvinyl alcohol resin is preferably used in view of adhesiveness. Further, an adhesive containing a polyvinyl alcohol resin having an acetoacetyl group is more preferably used in view of improved durability. The aforementioned aqueous adhesive is usually used as an adhesive in the form of an aqueous solution, and usually contains 0.5 to 60% by weight of solid contents.

For an active energy ray-curable adhesive, a compound having a mono- and poly-functional (meth)acryloyl group or a compound having a vinyl group can be used as a curable component, and other than that, a photocationic curable component mainly comprising an epoxy compound and/or an oxetane compound and a photo acid generating agent can also be used. As active energy ray, electron ray or ultraviolet light can be used.

The methacrylic resin [A] and the methacrylic resin composition of the present invention and a formed article comprising thereof can be used as a member for various uses. Examples of specific uses can include signboard parts such as advertising pillars, stand signboards, side signboards, transom signboards, roof signboards and the like; marking films; display parts such as showcases, partition panels store displays and the like; illumination parts such as fluorescent lamp covers, mood lighting covers, lamp shades, luminous ceilings, luminous walls, chandeliers and the like; interior parts such as furniture, pendants, mirrors and the like; architectural parts such as doors, domes, safety window glass, partitions, stair baseboards, balcony baseboards, leisure building roofs and the like; transportation related parts such as air plane windshields, pilot visors, motorcycle and motorboat windshields, bus sun visors, automobile side visors, rear visors, head wings, headlight covers, automobile interior members, automobile exterior members such as bumpers and the like; electronic equipment parts such as face plates for audiovisuals, stereo covers, television protective masks, vending machines, cellular phones, personal computers and the like; medical equipment parts such as incubators, roentgen parts and the like; instrument related parts such as machine covers, instrument covers, experiment devices, rulers, dials, observation windows and the like; optics related parts such as liquid crystal protective plates, light guide plates, light guide films, Fresnel's lens, lenticular lens, front panels of various displays, diffusion boards and the like; traffic related parts such as road signs, direction boards, mirrors on curved roads, sound insulating walls and the like; in addition, greenhouses, large-sized water tanks, box-type water tanks, bathroom members, clock panels, bath tubs, sanitary, desk mats, parts of recreational devices, toys, face protecting masks when welding, back sheets of solar cells, and front sheets of flexible solar cells; and surface materials used in, for example, personal computers, cellular phones, furniture, vending machines, bathroom members and the like.

As applications of materials having excellent transparency and thermal resistance obtained by laminating the methacrylic resin [A] or the methacrylic resin composition of the present invention and a base material made of a steel material, plastics, wood, glass or the like, they can also be suitably used in wallpaper; surfaces of automobile interior members; surfaces of automobile exterior members such as bumpers; surfaces of cellular phones; furniture surfaces; surfaces of personal computers; surfaces of vending machines; and surfaces of bathroom members such as bath tubs, and the like.

A film as one embodiment of the formed article of the present invention has a high transparency and a high thermal resistance. Therefore, they are suitable for optical use, and in particular suitable for use in a polarizer protective film, a liquid crystal protective plate, a surface material for mobile information terminals, a display window protective film for mobile information terminals, a light guide film, a transparent electric conductive film with a surface coated with silver nanowires and/or carbon nanotubes, and a front panel for various displays. In particular, the film of the present invention comprising a methacrylic resin composition comprising the methacrylic resin [A] and the polycarbonate resin and/or the phenoxy resin can provide desired phase difference, and thus is suitable for optical use in polarizer protective films, phase difference films and the like.

The film of the present invention has high transparency and high thermal resistance. Therefore, it can be used for an IR cut film, a security film, a shatterproof film, a decoration film, a metal decoration film, a shrink film, a film for in-mold labels in addition to optical use.

In a case where a film as one embodiment of the formed article of the present invention is used for a polarizer protective film or a phase difference film, it may be laminated on only one side of the polarizer film, or may be laminated on both sides thereof. When laminated with a polarizer film, lamination may be performed through an adhesive layer or an adherent layer. A stretched film having a film thickness of 1 µm to 100 µm, comprising a polyvinyl alcohol resin and iodine can be used for a polarizer film.

A film as one embodiment of the formed article of the present invention may be laminated on one side of a polarizer film and a known optical film may be laminated on the other side of the polarizer film. Examples of the optical film to be laminated are not particularly limited by the material thereof and can include films made of a cellulose resin, a polycarbonate resin, a cyclic polyolefin resin, and other methacrylic resins.

A cellulose resin is an ester of cellulose and fatty acid. Specific examples of such a cellulose ester resin can include cellulose triacetate, cellulose diacetate, cellulose tripropionate, cellulose dipropionate and the like. Among these, cellulose triacetate is particularly preferred. Many cellulose triacetate products are commercially available and thus cellulose triacetate is advantageous also in terms of availability and cost. Examples of commercial items of cellulose triacetate can include product names, "UV-50", "UV-80", "SH-80", "TD-80U", "TD-TAC", and "UZ-TAC" from Fujifilm Corporation and "KC series" from Konica Minolta, Inc.

A cyclic polyolefin resin is a generic name for resins prepared by polymerization with cyclic olefin as a polymerization unit. Examples of the cyclic polyolefin resin can include resins described in, for example, JP H01-240517 A, JP H03-14882 A, JP H03-122137 A and the like. Specific examples thereof can include a ring-opening (co)polymer of cyclic olefin, an addition polymer of cyclic olefin, a copolymer of cyclic olefin and α-olefin such as ethylene, propylene and the like (typically, random copolymer), and, graft polymers prepared by modifying the aforementioned polymers with unsaturated carboxylic acid or a derivative thereof, as well as the hydrogenated products thereof. A specific example of cyclic olefin is a norbornene monomer.

As cyclic polyolefin resins, various products are commercially available. Specific examples thereof can include product names "ZEONEX" and "ZEONOR" from ZEON Corporation, a product name "ARTON" from JSR Corporation, a product name "TOPAS" from Polyplastics Co., Ltd., and a product name "APEL" from Mitsui Chemicals, Inc.

As other methacrylic resins, any appropriate methacrylic resin can be employed herein, as long as these resins do not deteriorate the effects of the present invention. Examples thereof can include polymethacrylic acid esters such as polymethyl methacrylate, methyl methacrylate-(meth) acrylic acid copolymer, methyl methacrylate-(meth)acrylic acid ester copolymer, methyl methacrylate-acrylic ester-(meth)acrylic acid copolymer, methyl (meth)acrylate-styrene copolymer (e.g., MS resin), polymers having an alicyclic hydrocarbon group (for example, methyl methacrylate-cyclohexyl methacrylate copolymer, methyl methacrylate-norbornyl (meth)acrylate copolymer).

Specific examples of other methacrylic resins can include ACRYPET VH and ACRYPET VRL20A from Mitsubishi Rayon Co., Ltd., an acryl resin prepared by copolymerization of methyl methacrylate and a maleimide monomer as described in JP 2013-033237 A or WO2013/005634, an acrylic resin having a ring structure within the molecule as described in WO2005/108438, a methacrylic resin having a ring structure within the molecule as described in JP 2009-197151 A, a methacrylic resin having a high glass transition temperature (Tg) which is obtained by intramolecular cross-linking or intramolecular cyclization.

Methacrylic resins having a lactone ring structure can also be used as other methacrylic resins, since such methacrylic resins have high thermal resistance and high transparency, and high mechanical strength by biaxial stretching.

Examples of a methacrylic resin having a lactone ring structure can include methacrylic resins having lactone ring structures as described in JP 2000-230016 A, JP 2001-151814 A, JP 2002-120326 A, JP 2002-254544 A, JP 2005-146084 A, and the like.

Below, the present invention is described with reference to Examples and Comparative Examples. However, the present invention shall not be limited to the following examples. Note that values for physical properties and the like were measured by the following methods.

(Polymerization Conversion Ratio)

Inert Cap 1 (df=0.4 μm, 0.25 mm I.D.×60 m) from GL Sciences Inc. was connected as a column to a Shimadzu gas chromatography system GC-14A, and measurements were performed under the following conditions: the injection temperature was 180° C.; the detector temperature was 180° C.; the column temperature was increased from 60° C. (a holding time of 5 min.) to 200° C. at a rate of temperature increase of 10° C./min and then held for 10 min. The polymerization conversion ratio was computed based on these results.

(Chromatogram Measurement by GPC and Determination of Molecular Weight Distribution Based on Chromatogram)

In 5 ml of tetrahydrofuran, 4 mg of a resin material to be tested was dissolved, and then filtered with a 0.1-μm filter, thereby preparing a test subject solution.

The test subject solution (20 μl) was injected into a GPC system (TOSOH, HLC-8320) equipped with columns of two TOSOH TSKgel SuperMultipore HZM-M connected to a SuperHZ4000 in series and a differential refractive index detector as a detection part, and then the chromatogram was measured. Tetrahydrofuran as an eluent was caused to pass through at a flow rate of 0.35 ml/min, and the column temperature was set at 40° C.

Data of 10 standard polystyrenes were used to make a calibration curve. Specifically, standard polystyrenes with molecular weights of 400-5000000 were measured by gel permeation chromatography, and then a calibration curve showing the relationship between retention time and molecular weight was created. A point at which the slope on the high molecular weight side changed from zero to a positive value and a point at which the slope on the low molecular weight side changed from a negative value to zero in the chromatogram were connected to form a base line. When the chromatogram had a plurality of peaks, a point at which the slope of the peak on the highest molecular weight side changed from zero to a positive value and a point at which the slope of the peak on the lowest molecular weight side changed from a negative value to zero were connected to form a base line.

A molecular weight M in terms of polystyrene corresponding to the retention time having the value of the maximum strength in the chromatogram was calculated from the aforementioned calibration curve.

Furthermore, a weight average molecular weight Mw and a number average molecular weight Mn in terms of polystyrene were calculated by a known calculation method from the chromatogram.

Area S of the region enclosed by the chromatogram and the base line was measured.

(Determination of Approximate Curve by Gaussian Function and Determination of Molecular Weight Distribution and the Like Based on Approximate Curve)

The value of the maximum strength in the chromatogram obtained by GPC measurement was standardized to be 1. Only data having the strength accounting for 0.7 (70%) or more relative to the value of the maximum strength was compiled, and then fitted to Gaussian function: $Y=\exp(-[(X-u)^2/w^2])$ by the method of nonlinear least squares, and an approximate curve was determined. Note that X denotes a retention time, and w denotes a variable. As the initial value of "u" in the method of nonlinear least squares, the retention time having the value of the maximum strength was used. Calculation by the method of nonlinear least squares was performed using the solver function of Excel 2003 (spreadsheet software: Microsoft).

A weight average molecular weight $Mw_g$ and a number average molecular weight $Mn_g$ were calculated in terms of polystyrene by a known calculation method from the approximate curve.

Area $S_g$ of the region enclosed by the approximate curve and the base line was measured. The ratio $S_g/S$ of the area $S_g$ of the region enclosed by the approximate curve and the base line to the area S of the region enclosed by the chromatogram and the base line was calculated.

(Triad Syndiotacticity (rr))

$^1$H-NMR measurements were performed for resin samples. An area (X) of the 0.6 to 0.95 ppm region and an area (Y) of the 0.6 to 1.35 ppm region were measured when TMS was taken as 0 ppm, and a value computed using the expression: $(X/Y) \times 100$ was taken as the triad syndiotacticity (rr) (%).

Apparatus: a nuclear magnetic resonance system (Bruker ULTRA SHIELD 400 PLUS)
Solvent: deuterated chloroform
Nuclide to be measured: $^1$H
Measurement temperature: room temperature
Integration times: 64 times (Glass Transition Temperature [Tg])

The midpoint glass transition temperature found from a DSC curve was defined as the glass transition temperature. The DSC curve was obtained by differential scanning colorimetry at the second heating, when a resin to be measured was heated to 230° C. in accordance with JIS K7121, cooled to room temperature, heated from room temperature to 230° C. at 10° C./min, and then measured using a differential scanning calorimeter (Shimadzu Corporation, DSC-50 (model number)).

(Melt Flow Rate (MFR))

Measurements were performed in accordance with JIS K7210 under the conditions of 230° C., a load of 3.8 kg and for 10 minutes.

(Thermal Decomposition Resistance)

Resin samples were measured for thermogravimetric decreases using a thermogravimeter (Shimadzu, TGA-50 (model number)) under an air atmosphere and conditions of increasing the temperature from 200° C. to 600° C. at 10°

C./min. Temperature $T_{d1}$ at which the weight decreased by the 1% weight from the weight at 200° C. was computed, and then the thermal decomposition resistance was evaluated according to the following criteria.

A: $T_{d1}$ of not less than 318° C.

B: $T_{d1}$ of less than 318° C.

(Thermal Decomposition Resistance (Constant Temperature))

Resin samples were measured for thermogravimetric decreases using a thermogravimeter (Shimadzu, TGA-50 (model number)) under an air atmosphere and conditions of increasing the temperature from 50° C. to 290° C. at 20° C./min and then keeping the temperature at 290° C. for 20 minutes. Thermal decomposition resistance when the temperature was kept at 290° C. for 20 minutes was evaluated by the following criteria based on the weight at 50° C. (retention: 100%).

A: Retention of not less than 60%

B: Retention of less than 60%

(Bending Strength)

A resin sample was injection molded at 230° C. to obtain a test piece (B) with 80 mm×10 mm×a thickness of 4.0 mm. In accordance with JIS K7171, three-point bending was performed on the test piece (B) at 23° C. using an autograph (Shimadzu Corporation), and the maximum point stress was taken as the bending stress.

(Variation in Thickness)

A resin sample was dried at 80° C. for 12 hours. Using a 20-mm φ single screw extruder (from OCS), the resin material was extruded at a resin temperature of 260° C. through a T-die with a width of 150 mm, and directly fed into a cooling roll to obtain an unstretched film with a width of 100 mm and a thickness of 180 μm.

The minimum thickness $D_{min}$ [mm] and the maximum thickness $D_{max}$ [mm] of the unstretched film were obtained, and then the variation in thickness as defined by the following expression was obtained.

Variation in film thickness (%)=$\{(D_{max}-D_{min})/D_{min}\}\times100$

The variation in thickness was evaluated according to the following criteria.

A: The variation in thickness is less than 5%.

B: The variation in thickness ranges from 5% to 20%.

C: The variation in thickness is more than 20%.

(Surface Smoothness)

A surface of the above unstretched film was visually observed, and the quality of the surface smoothness was evaluated according to the following criteria.

A: The surface is smooth and good.

B: The surface is uneven.

(Haze)

In accordance with JIS K7136, the haze of the above unstretched film was measured using a haze meter (Murakami Color Research Laboratory Co., Ltd., HM-150).

(Heat Contraction Ratio)

The above unstretched film was cut out into 50 mm×40 mm, and placed in a tensile testing machine (Shimadzu AG-IS 5 kN) so that the distance between chucks was 40 mm, stretched at a stretching temperature of 15° C. above the glass transition temperature, a stretching rate of 500%/min in one direction and a stretching ratio of two times in one direction was maintained for 10 seconds. Quenching was performed to obtain a stretched film with a thickness of 100 μm.

A straight line with a length of 70 mm was drawn on a surface of the stretched film obtained, and the film was heated for 30 minutes in a forced air circulation thermostat oven maintained at a temperature of 110° C. Then the length (L (mm)) of the drawn straight line was read on a scale, and the heat contraction ratio was calculated using the following expression.

Heat contraction ratio (%)=$(70-L)/70\times100$ (Total Light Transmittance)

A resin material was formed by heat press at 230° C. to obtain a test piece (A) with 50 mm×50 mm×a thickness of 3.2 mm. In accordance with JIS K7361-1, the total light transmittance of the test piece (A) was measured with a haze meter (Murakami Color Research Laboratory Co., Ltd., HM-150).

(Yellow Index (YI))

The above test piece (A) was measured in a light path length of 3.2 mm with a colorimetric color difference meter (Nippon Denshoku Industries Co., Ltd, ZE-2000) in accordance with JIS Z8722.

The quality of YI was evaluated according to the following criteria.

A: YI is less than 5.

B: YI is not less than 5.

(Retardation (Rth) in the Direction of Film Thickness)

The above unstretched film was cut out into 100 mm×100 mm, and placed in a pantograph-type biaxial tensile testing machine (Toyo seiki), subjected to sequential biaxial stretching at a stretching temperature (glass transition temperature+15° C.), a stretching rate of 500%/min in one direction and a stretching ratio of two times in one direction, and then maintained for 10 seconds. Quenching was performed to obtain a biaxially stretched film with a thickness of 40 μm.

A test piece of 40 mm×30 mm was cut out from the stretched film. The test piece was then placed on an automatic birefringence meter (Oji Scientific Instruments, KOBRA-WR), and then a phase difference was measured at a temperature of 23±2° C., at a humidity of 50±5%, at a wavelength of 590 nm and in the direction of 40° inclination, so as to calculate refractive indices $n_x$, $n_y$ and $n_z$ from the value and the mean refractive index, and a retardation in the thickness direction Rth=$((n_x+n_y)/2-nz)\times d$. $n_x$ is a refractive index in the direction of in-plane slow axis, $n_y$ is a refractive index in the direction of right angle in plane with respect to the slow axis, and $n_z$ is a refractive index in the depth direction.

The thickness d[nm] of the test piece was measured with a digimatic indicator (Mitutoyo Corporation), and the mean refractive index n required for computing refractive indices $n_x$, $n_y$ and $n_z$ was obtained by measurement with a digital precision refractometer (Kalnew Optical Industrial Co., Ltd. KPR-20).

(Three-Point Bending Evaluation for Unstretched Sheet)

A methacrylic resin composition was dried at 80° C. for 12 hours. Using a 20-mm c single screw extruder (OCS), the methacrylic resin composition was extruded at a resin temperature of 260° C. through a T-die with a width of 150 mm, and directly fed into a cooling roll to obtain an unstretched sheet with a width of 100 mm and a thickness of 500 μm.

The thus obtained unstretched sheet was cut out into 50 mm×20 mm, and subjected to a three-point bending test at 23° C. using an autograph (Shimadzu Corporation). First, the unstretched sheet was placed on a support roller with a radius of 2 mm and a width of 34 mm. An indenter with a tip having a radius of 5 mm and a width of 34 mm was depressed toward the center of the supporting points from the top surface to the bottom of the sheet at a rate of 2 mm/min. When the quantity of depression reaches 10 mm from the horizontal position of the sheet, whether or not the sheet was ruptured was examined.

Production Example 1

A 5-L glass reaction vessel equipped with impellers and a three-way stopcock was purged with nitrogen. Into this, charged under room temperature were 1600 g of toluene, 3.19 g (13.9 mmol) of 1,1,4,7,10,10-hexamethyltriethylenetetramine, 68.6 g (39.6 mmol) of a 0.45 M concentration toluene solution of isobutylbis(2,6-di-t-butyl-4-methylphenoxy) aluminum and 7.91 g (13.2 mmol) of a 1.3 M concentration solution (solvent: 95% by mass of cyclohexane, 5% by mass of n-hexane) of sec-butyllithium. To this, 550 g of distillated methyl methacrylate was added dropwise at 20° C. with stirring over 30 minutes. After the completion of dropwise addition, it was stirred at 20° C. for 90 minutes. The color of the solution changed from yellow to clear. The polymerization conversion ratio of methyl methacrylate was 100% at this time.

To the resulting solution, 1500 g of toluene was added for dilution. Subsequently, the diluted solution was added to 100 kg of methanol to obtain a precipitate. The precipitate obtained was dried at 80° C., 140 Pa for 24 hours to obtain a methacrylic resin [1-1] having a GPC chromatogram-based weight average molecular weight $Mw_1$ of 58900, GPC chromatogram-based weight average molecular weight $Mw_1$/number average molecular weight $Mn_1$ of 1.06, a syndiotacticity (rr) of 74%, a Tg of 130° C. and the content of a structural unit derived from methyl methacrylate of 100% by mass.

Production Example 2

A 5-L glass reaction vessel equipped with impellers and a three-way stopcock was purged with nitrogen. Into this, charged under room temperature were 1600 g of toluene, 2.49 g (10.8 mmol) of 1,1,4,7,10,10-hexamethyltriethylenetetramine, 53.5 g (30.9 mmol) of a 0.45 M concentration toluene solution of isobutylbis(2,6-di-t-butyl-4-methylphenoxy) aluminum and 6.17 g (10.3 mmol) of a 1.3 M concentration solution (solvent: 95% by mass of cyclohexane, 5% by mass of n-hexane) of sec-butyllithium. To this, 550 g of distillated methyl methacrylate was added dropwise at 20° C. with stirring over 30 minutes. After the completion of dropwise addition, it was stirred at 20° C. for 90 minutes. The color of the solution changed from yellow to clear. The polymerization conversion ratio of methyl methacrylate was 100% at this time.

To the resulting solution, 1500 g of toluene was added for dilution. Subsequently, the above diluted solution was poured into 100 kg of methanol to obtain a precipitate. The precipitate obtained was dried at 80° C., 140 Pa for 24 hours to obtain a methacrylic resin [1-2] having a GPC chromatogram-based weight average molecular weight $Mw_1$ of 81400, GPC chromatogram-based weight average molecular weight $Mw_1$/number average molecular weight $Mn_1$ of 1.08, a syndiotacticity (rr) of 73%, a Tg of 131° C. and the content of a structural unit derived from methyl methacrylate of 100% by mass.

Production Example 3

A 5-L glass reaction vessel equipped with impellers and a three-way stopcock was purged with nitrogen. Into this, charged under room temperature were 1600 g of toluene, 2.49 g (10.8 mmol) of 1,1,4,7,10,10-hexamethyltriethylenetetramine, 53.5 g (30.9 mmol) of a 0.45 M concentration toluene solution of isobutylbis(2,6-di-t-butyl-4-methylphenoxy) aluminum and 6.17 g (10.3 mmol) of a 1.3 M concentration solution (solvent: 95% by mass of cyclohexane, 5% by mass of n-hexane) of sec-butyllithium. To this, 550 g of distillated methyl methacrylate was added dropwise at −20° C. with stirring over 30 minutes. After the completion of dropwise addition, it was stirred at −20° C. for 180 minutes. The color of the solution changed from yellow to clear. The polymerization conversion ratio of methyl methacrylate was 100% at this time.

To the resulting solution, 1500 g of toluene was added for dilution. Subsequently, the above diluted solution was poured into 100 kg of methanol to obtain a precipitate. The precipitate obtained was dried at 80° C., 140 Pa for 24 hours to obtain a methacrylic resin [1-3] having a GPC chromatogram-based weight average molecular weight $Mw_1$ of 96100, GPC chromatogram-based weight average molecular weight $Mw_1$/number average molecular weight $Mn_1$ of 1.07, a syndiotacticity (rr) of 83%, a Tg of 133° C. and the content of a structural unit derived from methyl methacrylate of 100% by mass.

Production Example 4

An autoclave equipped with a stirrer and a sampling tube was purged with nitrogen. To this, added were 100 parts by mass of refined methyl methacrylate, 0.0052 part by mass of 2,2'-azobis(2-methylpropionitrile (hydrogen abstraction ability: 1%, 1-hour half-life temperature: 83° C.) and 0.28 part by mass of n-octylmercaptan, and stirred to obtain a raw material liquid. Nitrogen was sent into this raw material liquid to remove dissolved oxygen in the raw material liquid.

The raw material liquid was transferred into a tank reactor connected to the autoclave through piping upto ⅔ of the capacity of the reactor. The temperature was maintained at 140° C., and a polymerization reaction was initiated by the batch method firstly. Once the polymerization conversion ratio reached 55% by mass, the raw material liquid was fed into the tank reactor from the autoclave at a flow rate so that the mean residence time was 150 minutes while the reaction liquid was withdrawn from the tank reactor at a flow rate corresponding to the feeding flow rate of the raw material liquid. The temperature was maintained at 140° C., and the polymerization reaction was performed by the continuous flow method. The steady-state polymerization conversion ratio was 55% by mass.

The reaction liquid withdrawn from the tank reactor in the steady state was fed into a multitubuler heat exchanger with an internal temperature of 230° C. for heating at a flow rate so that the mean residence time was two minutes. Subsequently, the heated reaction liquid was introduced into an adiabatic flash evaporator, and volatile matters mainly comprising unreacted monomers were removed to obtain a melt resin. The melt resin from which volatile matters had been removed was fed to a twin screw extruder with an internal temperature of 260° C., discharged in a strand form, and cut with a pelletizer to obtain a pelleted methacrylic resin [2-1] having a GPC chromatogram-based weight average molecular weight $Mw_2$ of 82000, GPC chromatogram-based weight average molecular weight $Mw_2$/number average molecular weight $Mn_2$ of 1.85, a syndiotacticity (rr) of 52%, a Tg of 120° C. and the content of a structural unit derived from methyl methacrylate of 100% by mass.

Production Example 5

The same operations were performed as in Production example 4 except that the amount of n-octylmercaptan was changed to 0.30 part by mass to obtain a methacrylic resin [2-2] having a GPC chromatogram-based weight average molecular weight $Mw_2$ of 76400, GPC chromatogram-based weight average molecular weight $Mw_2$/number average molecular weight $Mn_2$ of 1.81, a syndiotacticity (rr) of 53%, a Tg of 119° C. and the content of a structural unit derived from methyl methacrylate of 100% by mass.

Production Example 6

The same operations were performed as in Production example 4 except that 100 parts by mass of methyl methacrylate was changed to 99 parts by mass of methyl methacrylate and 1 part by mass of methyl acrylate, and the amount of n-octylmercaptan was changed to 0.26 part by mass, to obtain a methacrylic resin [2-3] having a GPC chromatogram-based weight average molecular weight $Mw_2$ of 88900, GPC chromatogram-based weight average molecular weight $Mw_2$/number average molecular weight $Mn_2$ of 1.88, a syndiotacticity (rr) of 51%, a Tg of 118° C. and the content of a structural unit derived from methyl methacrylate of 99.3% by mass.

Production Example 7

The same operations were performed as in Production example 4 except that the amount of 2,2'-azobis(2-methylpropionitrile) was changed to 0.0080 part by mass, and the amount of n-octylmercaptan was changed to 0.40 part by mass, the temperature in the tank reactor was changed to 120° C., and the mean residence time was changed to 120 minutes, to obtain a methacrylic resin [2-4] having a GPC chromatogram-based weight average molecular weight $Mw_2$ of 57800, GPC chromatogram-based weight average molecular weight $Mw_2$/number average molecular weight $Mn_2$ of 1.82, a syndiotacticity (rr) of 56%, a Tg of 122° C. and the content of a structural unit derived from methyl methacrylate of 100% by mass.

Production Example 8

The same operations were performed as in Production example 4 except that the amount of n-octylmercaptan was changed to 0.42 part by mass, to obtain a methacrylic resin [2-5] having a GPC chromatogram-based weight average molecular weight $Mw_2$ of 55500, GPC chromatogram-based weight average molecular weight $Mw_2$/number average molecular weight $Mn_2$ of 1.76, a syndiotacticity (rr) of 50%, a Tg of 118° C. and the content of a structural unit derived from methyl methacrylate of 100% by mass.

Production Example 9

The same operations were performed as in Production example 4 except that 100 parts by mass of methyl methacrylate was changed to 93.7 parts by mass of methyl methacrylate and 6.3 parts by mass of methyl acrylate, and the amount of 2,2'-azobis(2-methyl propionitrile) was changed to 0.0075 part by mass, the amount of n-octylmercaptan was changed to 0.25 part by mass, the temperature in the tank reactor was changed to 180° C., and the mean residence time was changed to 60 minutes, to obtain a methacrylic resin [2-6] having a GPC chromatogram-based weight average molecular weight $Mw_2$ of 84300, GPC chromatogram-based weight average molecular weight $Mw_2$/number average molecular weight $Mn_2$ of 2.18, a syndiotacticity (rr) of 47%, a Tg of 115° C. and the content of a structural unit derived from methyl methacrylate of 95% by mass.

Production Example 11

The same operations were performed as in Production example 4 except that the amount of n-octylmercaptan was changed to 0.225 part by mass to obtain a methacrylic resin [2-7] having a GPC chromatogram-based weight average molecular weight $Mw_2$ of 103600, GPC chromatogram-based weight average molecular weight $Mw_2$/number average molecular weight $Mn_2$ of 1.81, a syndiotacticity (rr) of 52%, a Tg of 120° C. and the content of a structural unit derived from methyl methacrylate of 100% by mass.

Production Example 12

To a glass-lined reaction vessel equipped with a condenser, a thermometer, a stirrer, and a capacity of 100 L, 48 kg of ion exchanged water was charged, and then 416 g of sodium stearate, 128 g of sodium lauroylsarcosinate and 16 g of sodium carbonate were added for dissolution. Subsequently, 11.2 kg of methyl methacrylate and 110 g of allyl methacrylate were added and then heated to 70° C. while stirring the mixture. Subsequently, 560 g of 2% potassium persulfate aqueous solution was added to initiate emulsion polymerization. The internal temperature increased due to heat generation by polymerization. After the internal temperature started to fall, the temperature was maintained at 70° C. over 30 minutes to obtain an emulsion.

720 g of 2% sodium persulfate aqueous solution was added to the obtained emulsion. Subsequently, a mixture comprising 12.4 kg of butyl acrylate, 1.76 kg of styrene and 280 g of allyl methacrylate was added dropwise over 60 minutes. After the completion of dropwise addition, stirring was continued for 60 minutes to perform the first stage seed emulsion polymerization.

To the emulsion obtained in the first stage seed emulsion polymerization, 320 g of 2% potassium persulfate aqueous solution was added, and then a mixture comprising 6.2 kg of methyl methacrylate, 0.2 kg of methyl acrylate and 200 g of n-octylmercaptan was added over 30 minutes. Stirring was continued for 60 minutes after completion of addition to perform second stage seed emulsion polymerization. The thus obtained emulsion was cooled to room temperature. In this manner, an emulsion containing a crosslinked rubber particles (A) accounting for 40% of the emulsion and having a core shell triple-layer structure with a volume-based mean particle diameter of 0.23 μm was obtained.

Production Example 13

Into a glass-lined reaction vessel equipped with a condenser, a thermometer, a stirrer, and a capacity of 100 L, 48 kg of ion exchanged water was charged, and then 252 g of a surfactant ("PELEX SS-H" from Kao Corporation) was added for dissolution. The reaction vessel was heated to 70° C. Subsequently, to this, 160 g of a 2% potassium persulfate aqueous solution was added, and then a mixture comprising 3.04 kg of methyl methacrylate, 0.16 kg of methyl acrylate and 15.2 g of n-octylmercaptan was added in block to initiate emulsion polymerization. Stirring was continued for 30 minutes after heat generation due to polymerization reaction ceased.

Subsequently, 160 g of a 2% potassium persulfate aqueous solution was added, and then a mixture comprising 27.4 kg of methyl methacrylate, 1.44 kg of methyl acrylate and 98 g of n-octylmercaptan was continuously added dropwise over two hours. After the completion of dropwise addition, the resultant was left to stand for 60 minutes to perform emulsion polymerization. The thus obtained emulsion was cooled to room temperature. In this manner, an emulsion containing (meth)acrylic acid ester polymer particles (B) accounting for 40% of the emulsion and having a volume-based mean particle diameter of 0.12 µm and a limiting viscosity of 0.44 g/dl was obtained.

Production Example 14

The emulsion containing the particles (A) obtained in Production example 12 and the emulsion containing the particles (B) obtained in Production example 13 were mixed to a weight ratio of particle (A):particle (B) of 2:1. The mixed emulsion was frozen at −20° C. over two hours. The frozen mixed emulsion was introduced into hot water at 80° C. in an amount twice as that of the emulsion, and then thawed to obtain a slurry. The slurry was maintained at 80° C. for 20 minutes, dehydrated, and then dried at 70° C., thereby obtaining a powder comprising crosslinked rubber particles (G1).

Production Example 15

With reference to Production Example 1 in WO2014-041803, crosslinked rubber particles (G2) having a volume-based mean particle diameter of 0.23 µm were obtained.

Example 1

The methacrylic resin [1-1] in 50 parts by mass was mixed with 50 parts by mass of the methacrylic resin [2-1], and melt-kneaded at 230° C. for three minutes with a Labo Plastomill (Toyo Seiki Kogyo Co., Ltd.) to manufacture a methacrylic resin [A-1].

The methacrylic resin [A-1] had: the content (MMA unit content) of a structural unit derived from methyl methacrylate of 100% by mass; a molecular weight $M_A$ of 63800 in terms of polystyrene corresponding to the retention time having the value of the maximum strength in a chromatogram; a GPC-chromatogram-based weight average molecular weight $Mw_A$ of 72200; the ratio $Mw_A/Mn_A$ (GPC-chromatogram-based weight average molecular weight $Mw_A$ to number average molecular weight $Mn_A$) of 1.43; a triad syndiotacticity (rr) of 61.8%; a glass transition temperature Tg of 125° C.; melt flow rate MFR of 2.6 g/10 min, thermal decomposition resistance ranked A; the ratio of $Mw_{gA}/Mn_{gA}$ (Gaussian function approximate curve-based weight average molecular weight $Mw_{gA}$ to number average molecular weight $Mn_{gA}$) of 1.06; and the ratio of $S_{gA}/S_A$ (Gaussian function approximate curve-based area $S_{gA}$ to chromatogram-based area $S_A$) of 0.65.

A resin material consisting only of the methacrylic resin [A-1] was designated as a methacrylic resin composition [1]. The methacrylic resin composition [1] had a molecular weight $M_C$ of 63800 in terms of polystyrene corresponding to the retention time having the value of the maximum strength in a chromatogram, a GPC chromatogram-based weight average molecular weight $Mw_C$ of 72200, the ratio $Mw_C/Mn_C$ (GPC chromatogram-based weight average molecular weight $Mw_C$ to number average molecular weight $Mn_C$) of 1.43, a triad syndiotacticity (rr) of 61.8%, a glass transition temperature Tg of 125° C., a melt flow rate MFR of 2.6 g/10 min, thermal decomposition resistance ranked A, the ratio $Mw_{gC}/Mn_{gC}$ (Gaussian function approximate curve-based weight average molecular weight $Mw_{gC}$ to number average molecular weight $Mn_{gC}$) of 1.06, and the ratio $S_{gC}/S_C$ of Gaussian function approximate curve-based area $S_{gC}$ and chromatogram-based area $S_C$ of 0.65.

Samples for evaluation were prepared using the methacrylic resin composition [1] and then measured for bending strength, variation in thickness, surface smoothness, thermal contraction rate, haze, total light transmittance, and yellow index. The results are shown in Table 1.

Example 2

The methacrylic resin [1-1] in 50 parts by mass, 50 parts by mass of the methacrylic resin [2-1] and 1 part by mass of a processing aid (Paraloid K125-P; Kureha Chemical Industry Co., Ltd.) were mixed, and melt-kneaded at 230° C. for three minutes using a Labo Plastomill (Toyo Seiki Kogyo Co., Ltd.) to manufacture a methacrylic resin composition [2] containing 99.0% by mass of the methacrylate rein [A-]. The physical properties of the methacrylic resin composition [2] were measured by the same method as that in Example 1. The results are shown in Table 1. Note that the methacrylic resin composition [2] had a GPC chromatogram-based weight average molecular weight $Mw_C$ of 77500, and a GPC chromatogram-based $Mw_C/Mn_C$ of 1.54.

Example 3

The methacrylic resin [1-1] in 50 parts by mass, 50 parts by mass of the methacrylic resin [2-1] and 1 part by mass of an ultraviolet absorber (ADK STAB LA-31; ADEKA Corp.) were mixed, and melt-kneaded at 230° C. for three minutes using a Labo Plastomill (Toyo Seiki Kogyo Co., Ltd.) to manufacture a methacrylic resin composition [3] containing 99.0% by mass of the methacrylic resin [A-1]. The physical properties of the methacrylic resin composition [3] were measured by the same method as that in Example 1. The results are shown in Table 1.

Examples 4 to 12

Methacrylic resins [A-2] to [A-10] were manufactured by the same method as in Example 1 except that the compositions as shown in Tables 1 and 2 were used and then the methacrylic resin compositions [4] to [12] containing 100% by mass each of the methacrylic resins [A-2] to [A-10], respectively, were manufactured. The physical properties of the methacrylic resins [A-2] to [A-10] and the methacrylic resin compositions [4] to [12] were measured by the same method as that in Example 1. The results are shown in Tables 1 and 2.

TABLE 1

| | Ex. | | | | | |
| --- | --- | --- | --- | --- | --- | --- |
| | 1 | 2 | 3 | 4 | 5 | 6 |
| methacrylic resin [1-1] [parts by mass] | 50 | 50 | 50 | 70 | 40 | 50 |
| methacrylic resin [2-1] [parts by mass] | 50 | 50 | 50 | 30 | | |
| methacrylic resin [2-2] [parts by mass] | | | | | 60 | 50 |

TABLE 1-continued

|  | Ex. 1 | Ex. 2 | Ex. 3 | Ex. 4 | Ex. 5 | Ex. 6 |
|---|---|---|---|---|---|---|
| processing aid [parts by mass] |  | 1 |  |  |  |  |
| UV absorber [parts by mass] |  |  | 1 |  |  |  |
| methacrylic resin (A) | [A-1] | [A-1] | [A-1] | [A-2] | [A-3] | [A-4] |
| MMA unit content [% by mass] | 100 | 100 | 100 | 100 | 100 | 100 |
| $M_A$ | 63800 | 63800 | 63800 | 63400 | 64900 | 63800 |
| $Mw_A$ | 72200 | 72200 | 72200 | 68200 | 71500 | 68600 |
| $Mw_A/Mn_A$ | 1.43 | 1.43 | 1.43 | 1.27 | 1.58 | 1.40 |
| rr [%] | 61.8 | 61.8 | 61.8 | 66.7 | 61.0 | 62.0 |
| Tg [° C.] | 125 | 125 | 125 | 127 | 124 | 125 |
| MFR (230° C. 3.8 Kg) [g/10 min] | 2.6 | 2.6 | 2.6 | 2.4 | 2.9 | 2.6 |
| thermal decomposition resistance | A | A | A | A | A | A |
| $Mw_{gA}/Mn_{gA}$ | 1.06 | 1.06 | 1.06 | 1.06 | 1.06 | 1.06 |
| $S_{gA}/S_A \times 100$ [%] | 65 | 64 | 65 | 78 | 65 | 70 |
| methacrylic resin composition | [1] | [2] | [3] | [4] | [5] | [6] |
| $M_C$ | 63800 | 63700 | 63800 | 63400 | 64900 | 63800 |
| $Mw_C$ | 72200 | 77500 | 72200 | 68200 | 71500 | 68600 |
| $Mw_C/Mn_C$ | 1.43 | 1.54 | 1.43 | 1.27 | 1.58 | 1.40 |
| Tg [° C.] | 125 | 125 | 125 | 127 | 124 | 125 |
| MFR (230° C. 3.8 Kg) [g/10 min] | 2.6 | 2.6 | 2.6 | 2.4 | 2.9 | 2.6 |
| thermal decomposition resistance | A | A | A | A | A | A |
| $Mw_{gC}/Mn_{gC}$ | 1.06 | 1.06 | 1.06 | 1.06 | 1.06 | 1.06 |
| $S_{gC}/S_C \times 100$ [%] | 65 | 64 | 65 | 78 | 65 | 70 |
| bending strength [MPa] | 102 | 105 | 102 | 104 | 97 | 99 |
| variation in thickness | A | A | A | B | A | A |
| surface smoothness | A | A | A | A | A | A |
| heat contraction ratio [%] | 5.7 | 6.0 | 5.7 | 4.2 | 8.1 | 7.1 |
| haze [%] | 0.1 | 0.1 | 0.1 | 0.1 | 0.1 | 0.1 |
| total light transmittance [%] | 92 | 92 | 92 | 92 | 92 | 92 |
| yellow index (YI) | A | A | A | A | A | A |

TABLE 2

|  | Ex. 7 | Ex. 8 | Ex. 9 | Ex. 10 | Ex. 11 | Ex. 12 |
|---|---|---|---|---|---|---|
| methacrylic resin [1-1] [parts by mass] | 60 | 60 |  |  |  |  |
| methacrylic resin [1-2] [parts by mass] |  |  | 50 | 50 | 50 |  |
| methacrylic resin [1-3] [parts by mass] |  |  |  |  |  | 40 |
| methacrylic resin [2-2] [parts by mass] | 40 |  |  |  |  |  |
| methacrylic resin [2-3] [parts by mass] |  | 40 |  |  |  |  |
| methacrylic resin [2-4] [parts by mass] |  |  | 50 |  |  |  |
| methacrylic resin [2-5] [parts by mass] |  |  |  | 50 |  | 60 |
| methacrylic resin [2-6] [parts by mass] |  |  |  |  | 50 |  |
| methacrylic resin (A) | [A-5] | [A-6] | [A-7] | [A-8] | [A-9] | [A-10] |
| MMA unit content [% by mass] | 100 | 99.7 | 100 | 100 | 97.5 | 100 |
| $M_A$ | 64800 | 64700 | 83200 | 83000 | 84200 | 86500 |
| $Mw_A$ | 72600 | 73800 | 69600 | 68400 | 82900 | 71700 |
| $Mw_A/Mn_A$ | 1.44 | 1.36 | 1.56 | 1.53 | 1.62 | 1.68 |
| rr [%] | 62.0 | 61.0 | 62.0 | 62.0 | 60.0 | 63.0 |
| Tg [° C.] | 126 | 126 | 124 | 124 | 123 | 124 |
| MFR (230° C. 3.8 Kg) [g/10 min] | 2.7 | 2.2 | 4.0 | 2.4 | 2.7 | 3.4 |
| thermal decomposition resistance | A | A | A | A | A | A |
| $Mw_{gA}/Mn_{gA}$ | 1.05 | 1.05 | 1.06 | 1.05 | 1.06 | 1.05 |
| $S_{gA}/S_A \times 100$ [%] | 74 | 74 | 64 | 67 | 60 | 51 |
| methacrylic resin composition | [7] | [8] | [9] | [10] | [11] | [12] |
| $M_C$ | 64800 | 64700 | 83200 | 83000 | 84200 | 86500 |
| $Mw_C$ | 72600 | 73800 | 69600 | 68400 | 82900 | 71700 |
| $Mw_C/Mn_C$ | 1.44 | 1.36 | 1.56 | 1.53 | 1.62 | 1.68 |
| Tg [° C.] | 126 | 126 | 124 | 124 | 123 | 124 |
| MFR (230° C. 3.8 Kg) [g/10 min] | 2.7 | 2.2 | 4.0 | 2.4 | 2.7 | 3.4 |
| thermal decomposition resistance | A | A | A | A | A | A |
| $Mw_{gC}/Mn_{gC}$ | 1.05 | 1.05 | 1.06 | 1.05 | 1.06 | 1.05 |
| $S_{gC}/S_C \times 100$ [%] | 74 | 74 | 64 | 67 | 60 | 51 |
| bending strength [MPa] | 102 | 106 | 93 | 95 | 114 | 104 |
| variation in thickness | A | A | A | A | A | A |
| surface smoothness | A | A | A | A | A | A |
| heat contraction ratio [%] | 5.9 | 5.5 | 5.8 | 7.6 | 8.0 | 6.3 |
| haze [%] | 0.1 | 0.1 | 0.1 | 0.1 | 0.1 | 0.1 |
| total light transmittance [%] | 92 | 92 | 92 | 92 | 92 | 92 |
| yellow index (YI) | A | A | A | A | A | A |

Comparative Example 1

The methacrylic resin [2-2] was melt-kneaded at 230° C. for three minutes using a Labo Plastomill (Toyo Seiki Kogyo Co., Ltd.), thereby manufacturing a methacrylic resin composition [13] containing 100% by mass of the methacrylic resin [2-2]. The physical properties of the methacrylic resin [2-2] and the methacrylic resin composition [13] were measured by the same method as that in Example 1. The results are shown in Table 3. Note that the methacrylic resin [2-2] had the content of a structural unit derived from methyl methacrylate (MMA unit content) of 100% by mass, a molecular weight $M_A$ of 69400 in terms of polystyrene corresponding to the retention time having the value of the maximum strength in a chromatogram, a GPC chromatogram-based weight average molecular weight $Mw_A$ of 76400, the ratio $Mw_A/Mn_A$ (GPC chromatogram-based weight average molecular weight $Mw_A$ to number average molecular weight $Mn_A$) of 1.81, a triad syndiotacticity (rr) of 53.0%, a glass transition temperature Tg of 119° C., a melt flow rate MFR of 3.6 g/10 min, thermal decomposition resistance ranked B, the ratio $Mw_g/Mn_g$ (Gaussian function approximate curve-based weight average molecular weight $Mw_g$ to number average molecular weight $Mn_g$) of 1.73, and the ratio $S_g/S$ (Gaussian function approximate curve-based area $S_g$ to chromatogram-based area S) of 0.91.

Comparative Example 2

A methacrylic resin composition [14] was manufactured by the same method as in Comparative example 1 except that the methacrylic resin [2-5] was used instead of the methacrylic resin [2-2]. The physical properties of the methacrylic resin [2-5] and the methacrylic resin composition [14] were determined by the same method as that in Example 1. The results are shown in Table 3.

Comparative Example 3

A methacrylic resin composition [15] was manufactured by the same method as in Comparative example 1 except that the methacrylic resin [1-1] was used instead of the methacrylic resin [2-2]. The physical properties of the methacrylic resin [1-1] and the methacrylic resin composition [15] were determined by the same method as that in Example 1. The results are shown in Table 3.

Comparative Example 4

A methacrylic resin composition [16] was manufactured by the same method as in Comparative example 1 except that the methacrylic resin [1-2] was used instead of the methacrylic resin [2-2]. The physical properties of the methacrylic resin [1-2] and the methacrylic resin composition [16] were determined by the same method as that in Example 1. The results are shown in Table 3.

Comparative Example 5

A methacrylic resin [3-1] was manufactured according to the recipe shown in Table 3 by the same method as in Example 1.

A resin material consisting only of the methacrylic resin [3-1] was designated as a methacrylic resin composition [17]. The physical properties were determined by the same method as that in Example 1. The results are shown in Table 3.

TABLE 3

|  | Comp. Ex. | | | | |
| --- | --- | --- | --- | --- | --- |
|  | 1 | 2 | 3 | 4 | 5 |
| methacrylic resin[1-1] [parts by mass] |  |  | 100 |  | 20 |
| methacrylic resin[1-2] [parts by mass] |  |  |  | 100 |  |
| methacrylic resin[2-1] [parts by mass] |  |  |  |  | 80 |
| methacrylic resin[2-2] [parts by mass] | 100 |  |  |  |  |
| methacrylic resin[2-5] [parts by mass] |  | 100 |  |  |  |
| methacrylic resin | [2-2] | [2-5] | [1-1] | [1-2] | [3-1] |
| MMA unit content[% by mass] | 100 | 100 | 100 | 100 | 100 |
| $M_A$ | 69400 | 51300 | 60300 | 84000 | 67400 |
| $Mw_A$ | 76400 | 55500 | 58900 | 81400 | 77400 |
| $Mw_A/Mn_A$ | 1.81 | 1.76 | 1.06 | 1.08 | 1.68 |
| rr [%] | 53.0 | 50.0 | 74.0 | 73.0 | 56.4 |
| Tg [° C.] | 119 | 118 | 130 | 131 | 121 |
| MFR(230° C. 3.8 Kg) [g/10 min] | 3.6 | 10 | 2.1 | 0.9 | 2.6 |
| thermal decomposition resistance | B | B | A | A | B |
| $Mw_{gA}/Mn_{gA}$ | 1.73 | 1.65 | 1.03 | 1.04 | 1.26 |
| $S_{gA}/S_A \times 100$ [%] | 96 | 97 | 91 | 90 | 76 |
| methacrylic resin composition | [13] | [14] | [15] | [16] | [17] |
| $M_C$ | 69400 | 51300 | 60300 | 84000 | 67400 |
| $Mw_C$ | 76400 | 55500 | 58900 | 81400 | 77400 |
| $Mw_C/Mn_C$ | 1.81 | 1.76 | 1.06 | 1.08 | 1.68 |
| Tg [° C.] | 119 | 118 | 130 | 131 | 121 |
| MFR(230° C. 3.8 Kg) [g/10 min] | 3.6 | 10 | 2.1 | 0.9 | 2.6 |
| thermal decomposition resistance | B | B | A | A | B |
| $Mw_{gC}/Mn_{gC}$ | 1.73 | 1.65 | 1.03 | 1.04 | 1.26 |
| $S_{gC}/S_C \times 100$ [%] | 96 | 97 | 91 | 90 | 76 |
| bending strength [MPa] | 90 | 60 | 105 | 120 | 98 |
| variation in thickness | A | A | C | C | A |
| surface smoothness | A | A | B | B | A |
| heat contraction ratio [%] | 19 | 22 | 3.1 | 2.7 | 5.4 |
| haze [%] | 0.1 | 0.1 | 0.5 | 0.8 | 0.1 |
| total light transmittance [%] | 92 | 92 | 91 | 91 | 92 |
| yellow index (YI) | A | A | B | B | A |

Examples 13-21

Methacrylic resin compositions [18] to [28] were manufactured with the recipes shown in Table 4 or 5 by the same method as in Example 1, and then evaluated in the same manner as in Example 1. Moreover, the retardation (Rth) in the direction of film thickness was evaluated. Evaluation results are shown in Table 4 or 5. Note that the polycarbonate resins used herein are the following 5 types.

PC1: Available from Mitsubishi Engineering Plastics Corporation, Iupilon HL-8000 (model number), MVR (300° C., 1.2 kg)=136 cm$^3$/10 min.

PC2: Available from Sumika Styron Polycarbonate Limited, SD POLYCA TR-2001 (model number), MVR (300° C., 1.2 kg)=200 cm$^3$/10 min.

PC3: Available from Sumika Styron Polycarbonate Limited, Calibre 301-40 (model number), MVR (300° C., 1.2 kg)=40 cm$^3$/10 min.

PC4: Available from Mitsubishi Engineering Plastics Corporation, AL071; MVR (300° C., 1.2 kg)=not less than 1000 cm$^3$/10 min. (accurate measurements were difficult due to high fluidity), Mv=5500.

PC5: mixture of 50 parts by mass of PC2 and 50 parts by mass of PC4; MVR (300° C., 1.2 kg)=not less than 1000 cm$^3$/10 min (accurate measurements were difficult due to high fluidity), Mv=8500.

Comparative Example 4

Moreover, the retardation (Rth) in the direction of film thickness was evaluated. Evaluation results are shown in Table 4.

Comparative Example 6

The methacrylic resin [2-7] was melt-kneaded at 230° C. for three minutes using a Labo Plastomill (Toyo Seiki Kogyo Co., Ltd.), and then evaluated similarly as in Example 13. Evaluation results are shown in Table 4.

TABLE 4

|  | Ex. | | | | Comp. Ex. | |
| --- | --- | --- | --- | --- | --- | --- |
|  | 13 | 14 | 15 | 16 | 4 | 6 |
| methacrylic resin [1-2] [parts by mass] | 57 | 57 | 57 | 57 | 100 |  |
| methacrylic resin [2-7] [parts by mass] | 43 | 43 | 43 | 43 |  | 100 |
| polycarbonate resin [PC1] [parts by mass] |  | 2 | 4 | 6 |  |  |
| methacrylic resin (A) | [A-11] | [A-11] | [A-11] | [A-11] | [1-2] | [2-7] |
| MMA unit content [% by mass] | 100 | 100 | 100 | 100 | 100 | 100 |
| $M_A$ | 80300 | 80300 | 80300 | 80300 | 84000 | 95000 |
| $Mw_A$ | 88600 | 88600 | 88600 | 88600 | 81400 | 103600 |
| $Mw_A/Mn_A$ | 1.32 | 1.32 | 1.32 | 1.32 | 1.08 | 1.81 |
| rr [%] | 62 | 62 | 62 | 62 | 73 | 52 |
| Tg [° C.] | 126 | 126 | 126 | 126 | 131 | 120 |
| MFR (230° C. 3.8 Kg) [g/10 min] | 1.3 | 1.3 | 1.3 | 1.3 | 0.9 | 1.4 |
| thermal decomposition resistance | A | A | A | A | A | B |
| $Mw_{gA}/Mn_{gA}$ | 1.05 | 1.05 | 1.05 | 1.05 | 1.04 | 1.73 |
| $S_{gA}/S_A \times 100$ [%] | 67 | 65 | 63 | 60 | 90 | 96 |
| methacrylic resin composition | [18] | [19] | [20] | [21] | [22] | [23] |
| $M_C$ | 80300 | 79400 | 79100 | 79000 | 84000 | 95000 |
| $Mw_C$ | 88600 | 84000 | 77300 | 75200 | 81400 | 103600 |
| $Mw_C/Mn_C$ | 1.32 | 1.48 | 1.60 | 1.62 | 1.08 | 1.81 |
| Tg [° C.] | 126 | 126 | 126 | 126 | 131 | 120 |
| MFR (230° C. 3.8 Kg) [g/10 min] | 1.3 | 1.3 | 1.4 | 1.5 | 0.9 | 1.4 |
| thermal decomposition resistance | A | A | A | A | A | B |
| $Mw_{gC}/Mn_{gC}$ | 1.05 | 1.05 | 1.05 | 1.05 | 1.04 | 1.73 |
| $S_{gC}/S_C \times 100$ [%] | 67 | 65 | 63 | 60 | 90 | 96 |
| bending strength [MPa] | 122 | 120 | 121 | 110 | 120 | 115 |
| variation in thickness | A | A | A | A | C | A |
| surface smoothness | A | A | A | A | B | A |
| heat contraction ratio [%] | 5.6 | 5.6 | 5.3 | 5.1 | 2.7 | 15 |
| haze [%] | 0.1 | 0.2 | 0.3 | 0.5 | 0.8 | 0.1 |
| total light transmittance [%] | 92 | 92 | 92 | 92 | 91 | 92 |
| yellow index (YI) | A | A | A | A | B | A |
| Retardation in film thickness direction (Rth) [nm] | −19 | −12 | −1.3 | 16 | −23 | −14 |

TABLE 5

|  | Ex. | | | | |
| --- | --- | --- | --- | --- | --- |
|  | 17 | 18 | 19 | 20 | 21 |
| methacrylic resin[1-2] [parts by mass] | 57 | 57 | 57 | 57 | 57 |
| methacrylic resin[2-7] [parts by mass] | 43 | 43 | 43 | 43 | 43 |
| polycarbonate resin[PC2] [parts by mass] | 4 | 2.8 |  |  |  |
| polycarbonate resin[PC3] [parts by mass] |  |  | 2.5 |  |  |
| polycarbonate resin[PC4] [parts by mass] |  |  |  | 5 |  |
| polycarbonate resin[PC5] [parts by mass] |  |  |  |  | 3.5 |
| processing aid [parts by mass] | 2 | 2 | 2 | 2 | 2 |
| methacrylic resin (A) | [A-11] | [A-11] | [A-11] | [A-11] | [A-11] |
| MMA unit content[% by mass] | 100 | 100 | 100 | 100 | 100 |

TABLE 5-continued

|  | Ex. 17 | Ex. 18 | Ex. 19 | Ex. 20 | Ex. 21 |
|---|---|---|---|---|---|
| $M_A$ | 80300 | 80300 | 80300 | 80300 | 80300 |
| $Mw_A$ | 88600 | 88600 | 88600 | 88600 | 88600 |
| $Mw_A/Mn_A$ | 1.32 | 1.32 | 1.32 | 1.32 | 1.32 |
| rr [%] | 62 | 62 | 62 | 62 | 62 |
| Tg [° C.] | 126 | 126 | 126 | 126 | 126 |
| MFR(230° C. 3.8 Kg) [g/10 min] | 1.3 | 1.3 | 1.3 | 1.3 | 1.3 |
| thermal decomposition resistance | A | A | A | A | A |
| $Mw_{gA}/Mn_{gA}$ | 1.05 | 1.05 | 1.05 | 1.05 | 1.05 |
| $S_{gA}/S_A \times 100$ [%] | 67 | 67 | 67 | 67 | 67 |
| methacrylic resin composition | [24] | [25] | [26] | [27] | [28] |
| $M_C$ | 74500 | 77800 | 79200 | 72000 | 76500 |
| $Mw_C$ | 90000 | 95000 | 96200 | 91500 | 98000 |
| $Mw_C/Mn_C$ | 1.89 | 1.80 | 1.78 | 2.55 | 2.08 |
| Tg [° C.] | 126 | 126 | 126 | 123 | 124 |
| MFR(230° C. 3.8 Kg) [g/10 min] | 1.4 | 1.3 | 1.3 | 1.8 | 1.5 |
| thermal decomposition resistance | A | A | A | A | A |
| $Mw_{gC}/Mn_{gC}$ | 1.05 | 1.05 | 1.05 | 1.05 | 1.05 |
| $S_{gC}/S_C \times 100$ [%] | 67 | 67 | 67 | 67 | 67 |
| bending strength [MPa] | 118 | 120 | 120 | 114 | 121 |
| variation in thickness | A | A | A | A | A |
| surface smoothness | A | A | A | A | A |
| heat contraction ratio [%] | 5.2 | 5.0 | 5.0 | 9.2 | 7.5 |
| haze [%] | 0.3 | 0.2 | 0.3 | 0.2 | 0.2 |
| total light transmittance [%] | 92 | 92 | 92 | 92 | 92 |
| yellow index (YI) | A | A | A | A | A |
| Retardation in film thickness direction (Rth) [nm] | 2.0 | −0.4 | −0.5 | 0.1 | −0.2 |

Examples 22-24

Methacrylic resin compositions [29] to [31] were manufactured with the recipes shown in Table 6 by the same method as in Example 1, unstretched films having a thickness of 0.5 mm were prepared with a facility same as that in Example 1, and then evaluated for strength by three-point bending measurement. The results are shown in Table 6.

TABLE 6

|  | Ex. 22 | Ex. 23 | Ex. 24 |
|---|---|---|---|
| methacrylic resin[1-2] [parts by mass] | 57 | 57 | 57 |
| methacrylic resin[2-7] [parts by mass] | 43 | 43 | 43 |
| croslinked rubber particles[G1] [parts by mass] | 30 |  |  |
| croslinked rubber particles[G2] [parts by mass] |  | 20 |  |
| methacrylic resin (A) | [A-11] | [A-11] | [A-11] |
| MMA unit content[% by mass] | 100 | 100 | 100 |
| $M_A$ | 80300 | 80300 | 80300 |
| $Mw_A$ | 88600 | 88600 | 88600 |
| $Mw_A/Mn_A$ | 1.32 | 1.32 | 1.32 |
| rr [%] | 62 | 62 | 62 |
| Tg [° C.] | 126 | 126 | 126 |
| MFR(230° C. 3.8 Kg) [g/10 min] | 1.3 | 1.3 | 1.3 |
| thermal decomposition resistance | A | A | A |
| $Mw_{gA}/Mn_{gA}$ | 1.05 | 1.05 | 1.05 |
| $S_{gA}/S_A \times 100$ [%] | 67 | 67 | 67 |
| methacrylic resin composition | [29] | [30] | [31] |
| $M_C$ | 81100 | 80300 | 80300 |
| $Mw_C$ | 90800 | 89300 | 88600 |
| $Mw_C/Mn_C$ | 1.43 | 1.38 | 1.32 |
| Tg [° C.] | 123 | 124 | 126 |
| MFR(230° C. 3.8 Kg) [g/10 min] | 1.5 | 1.5 | 1.3 |
| thermal decomposition resistance | A | A | A |
| $Mw_{gC}/Mn_{gC}$ | 1.05 | 1.05 | 1.05 |
| $S_{gC}/S_C \times 100$ [%] | 56 | 67 | 67 |
| Three-point bending | no fracture | no fracture | fracture |

Examples 25-27

Methacrylic resin compositions [33] to [35] were manufactured with the recipes shown in Table 7 by the same method as in Example 1, and then evaluated in the same manner as in Example 13. Furthermore, thermal decomposition resistance (constant temperature) was evaluated. The evaluation results are shown in Table 7. Note that phenoxy resins used herein are as follows.

Ph1: YP-50S (model number) from NIPPON STEEL & SUMIKIN CHEMICAL CO., LTD with a number average molecular weight of 220000, a molecular-weight distribution of 2.5, and a glass transition temperature of 95.6° C.)

Ultraviolet absorber: ADK STAB LA-F70 (model number) from ADEKA Corp.

TABLE 7

|  | Ex. 13 | Ex. 25 | Ex. 26 | Ex. 27 |
|---|---|---|---|---|
| methacrylic resin[1-2] [parts by mass] | 57 | 57 | 57 | 57 |
| methacrylic resin[2-7] [parts by mass] | 43 | 43 | 43 | 43 |

TABLE 7-continued

| | Ex. | | | |
|---|---|---|---|---|
| | 13 | 25 | 26 | 27 |
| phenoxy resin [ph1] [parts by mass] | | 3.0 | 1.0 | 3.0 |
| polycarbonate resin[PC3] [parts by mass] | | | | 1.0 |
| UV absorber [parts by mass] | | | 0.9 | |
| methacrylic resin(A) | [A-11] | [A-11] | [A-11] | [A-11] |
| MMA unit content[wt %] | 100 | 100 | 100 | 100 |
| $M_A$ | 80300 | 80300 | 80300 | 80300 |
| $Mw_A$ | 88600 | 88600 | 88600 | 88600 |
| $Mw_A/Mn_A$ | 1.32 | 1.32 | 1.32 | 1.32 |
| rr [%] | 62 | 62 | 62 | 62 |
| Tg [° C.] | 126 | 126 | 126 | 126 |
| MFR(230° C. 3.8 Kg) [g/10 min] | 1.3 | 1.3 | 1.3 | 1.3 |
| thermal decomposition resistance | A | A | A | A |
| $Mw_{gA}/Mn_{gA}$ | 1.05 | 1.05 | 1.05 | 1.05 |
| $S_{gA}/S_A \times 100$ [%] | 67 | 67 | 67 | 67 |
| methacrylic resin composition | [18] | [33] | [34] | [35] |
| $M_C$ | 80300 | 79900 | 88100 | 79900 |
| $Mw_C$ | 88600 | 87600 | 88300 | 87100 |
| $Mw_C/Mn_C$ | 1.32 | 1.38 | 1.34 | 1.41 |
| rr [%] | 62 | 62 | 62 | 62 |
| Tg [° C.] | 126 | 124 | 124 | 125 |
| MFR(230° C. 3.8 Kg) [g/10 min] | 1.3 | 1.7 | 1.6 | 1.7 |
| thermal decomposition resistance | A | A | A | A |
| thermal decomposition resistance (temp. const.) | B | A | A | A |
| $Mw_{gC}/Mn_{gC}$ | 1.05 | 1.05 | 1.05 | 1.05 |
| $S_{gC}/S_C \times 100$ [%] | 67 | 67 | 67 | 67 |
| bending strength [MPa] | 122 | 122 | 120 | 121 |
| variation in thickness | A | A | A | A |
| surface smoothness | A | A | A | A |
| heat contraction ratio [%] | 5.6 | 6.6 | 5.3 | 7.0 |
| haze [%] | 0.1 | 0.3 | 0.3 | 0.3 |
| total light transmittance [%] | 92 | 92 | 92 | 92 |
| yellow index (YI) | A | A | A | A |
| Retardation in film thickness direction (Rth) [nm] | −19 | −0.3 | −9.0 | 0.5 |

The invention claimed is:

1. A methyl methacrylate-based polymer, comprising a structural unit derived from methyl methacrylate,
wherein a total content of the structural unit derived from methyl methacrylate is not less than 90% by mass, and
wherein the methyl methacrylate-based polymer has:
a molecular weight $M_A$ of not less than 30 thousand and not more than 100 thousand wherein the molecular weight $M_A$ is a molecular weight in terms of polystyrene corresponding to a peak retention time having a value of the maximum strength in a chromatogram of the methyl methacrylate-based polymer obtained by gel permeation chromatography;
a ratio $S_{gA}/S_A$ of area $S_{gA}$ to area $S_A$ of 45 to 80% wherein the area $S_A$ is area of a region enclosed by the chromatogram and a base line, in which the base line is obtained by connecting a first point at which a slope of the chromatogram on a higher molecular weight side of the peak retention time changes from zero to a positive value and a second point at which a slope of the chromatogram on a lower molecular weight side of the peak retention time changes from a negative value to zero, the area $S_{gA}$ is area of a region enclosed by an approximate curve and the base line of the chromatogram, and the approximate curve is obtained by fitting data in the chromatogram between the first point and the second point to a Gaussian function by a nonlinear least squares method, and the data have a strength of not less than 70% relative to the value of the maximum strength in the chromatogram; and
a ratio $Mw_{gA}/Mn_{gA}$ of a weight average molecular weight $Mw_{gA}$ to a number average molecular weight $Mn_{gA}$ of not less than 1.01 and not more than 1.20 wherein the weight average molecular weight $Mw_{gA}$ and the number average molecular weight $Mn_{gA}$ are a weight average molecular weight and a number average molecular weight, respectively, in terms of polystyrene computed based on the approximate curve obtained by the fitting.

2. The methyl methacrylate-based polymer according to claim 1, further having a ratio $Mw_A/Mn_A$ of a weight average molecular weight $Mw_A$ to a number average molecular weight $Mn_A$ of 1.3 to 3.0 wherein the weight average molecular weight $Mw_A$ and the number average molecular weight $Mn_A$ are a weight average molecular weight and a number average molecular weight, respectively, in terms of polystyrene computed based on the chromatogram between the first point and the second point.

3. The methyl methacrylate-based polymer according to claim 1, wherein the total content of the structural unit derived from methyl methacrylate is not less than 99% by mass.

4. The methyl methacrylate-based polymer according to claim 1, further having a triad syndiotacticity (rr) of not less than 58%.

5. The methyl methacrylate-based polymer according to claim 1, further having a midpoint glass transition temperature of not less than 120° C. as measured by differential scanning calorimetry.

6. A methacrylic resin composition, comprising
100 parts by mass of the methyl methacrylate-based polymer according to claim 1 and
1 to 10 parts by mass of a polycarbonate resin.

7. A methacrylic resin composition, comprising
100 parts by mass of the methyl methacrylate-based polymer according to claim 1 and
5 to 30 parts by mass of a crosslinked rubber.

8. A methacrylic resin composition, comprising
100 parts by mass of the methyl methacrylate-based polymer according to claim 1 and
0.1 to 10 parts by mass of a phenoxy resin.

9. A methacrylic resin composition, comprising
not less than 70% by mass of methyl methacrylate-based polymer [A] having a total content of a structural unit derived from methyl methacrylate of not less than 90% by mass,
wherein the methacrylic resin composition has:
a molecular weight $M_C$ of not less than 30 thousand and not more than 100 thousand wherein the molecular weight $M_C$ is a molecular weight in terms of polystyrene corresponding to a peak retention time having a value of the maximum strength in a chromatogram of the methacrylic resin composition obtained by gel permeation chromatography;
a ratio $S_{gC}/S_C$ of area $S_{gC}$ to area $S_C$ of 45 to 80% wherein the area $S_C$ is area of a region enclosed by the chromatogram and a base line, in which the base line is obtained by connecting a first point at which a slope of the chromatogram on a higher molecular weight side of the peak retention time changes from zero to a positive value and a second point at which a slope of the chromatogram on a lower molecular weight side of the peak retention time changes from a negative value to zero, the area $S_{gC}$ is area of a region enclosed by an approximate curve and the base line of the chromatogram, the approximate curve is obtained by fitting data in the chromatogram between the first point and the second point to a Gaussian function by a nonlinear least squares method and the data have a strength of not less than 70% relative to the value of the maximum strength in the chromatogram; and
a ratio $Mw_{gC}/Mn_{gC}$ of a weight average molecular weight $Mw_{gC}$ to a number average molecular weight $Mn_{gC}$ of not less than 1.01 and not more than 1.20 wherein the weight average molecular weight $Mw_{gC}$ and the number average molecular weight $Mn_{gC}$ are a weight average molecular weight and a number average molecular weight, respectively, in terms of polystyrene computed based on the approximate curve obtained by the fitting.

10. The methacrylic resin composition according to claim 9, further having a ratio $Mw_C/Mn_C$ of a weight average molecular weight $Mw_C$ to a number average molecular weight $Mn_C$ of 1.3 to 3.0 wherein the weight average molecular weight $Mw_C$ and the number weight average molecular weight $Mn_C$ are a weight average molecular weight and a number average molecular weight, respectively, in terms of polystyrene computed based on the chromatogram between the first point and the second point.

11. The methacrylic resin composition according to claim 9, wherein the methyl methacrylate-based polymer [A] has the total content of the structural unit derived from methyl methacrylate of not less than 99% by mass.

12. The methacrylic resin composition according to claim 9, wherein the methyl methacrylate-based polymer [A] has a triad syndiotacticity (rr) of not less than 58%.

13. The methacrylic resin composition according to claim 9, further having a midpoint glass transition temperature of not less than 120° C. as measured by differential scanning calorimetry.

14. The methacrylic resin composition according to claim 9, further comprising
1 to 10 parts by mass of a polycarbonate resin relative to 100 parts by mass of the methyl methacrylate-based polymer [A].

15. The methacrylic resin composition according to claim 9, further comprising
5 to 30 parts by mass of a crosslinked rubber relative to 100 parts by mass of the methyl methacrylate-based polymer [A].

16. The methacrylic resin composition according to claim 9, further comprising
0.1 to 10 parts by mass of a phenoxy resin relative to 100 parts by mass of the methyl methacrylate-based polymer [A].

17. A formed article, comprising
the methyl methacrylate-based polymer according to claim 1.

18. A film, comprising
the methyl methacrylate-based polymer according to claim 1.

19. A stretched film, comprising
the methyl methacrylate-based polymer according to claim 1.

20. A phase difference film, comprising
the methyl methacrylate-based polymer according to claim 1.

21. A polarizer protective film, comprising
the methyl methacrylate-based polymer according to claim 1.

22. A method for manufacturing the methyl methacrylate-based polymer according to claim 1, the method comprising
melt-kneading a methyl methacrylate-based polymer [I] having a triad syndiotacticity (rr) of not less than 65% and a methyl methacrylate-based polymer [II] having a triad syndiotacticity (rr) of 45 to 58% in a mass ratio of the methyl methacrylate-based polymer [I] to the methyl methacrylate-based polymer [II] of 40/60 to 70/30.

23. A method for manufacturing the methacrylic resin composition according to claim 9, the method comprising
melt-kneading a methyl methacrylate-based polymer [I] having a triad syndiotacticity (rr) of not less than 65% and a methyl methacrylate-based polymer [II] having a triad syndiotacticity (rr) of 45 to 58% in a mass ratio of the methyl methacrylate-based polymer [I] to the methyl methacrylate-based polymer [II] of 40/60 to 70/30 to obtain the methyl methacrylate-based polymer [A].

24. A method for manufacturing the methacrylic resin composition according to claim 6, the method comprising
melt-kneading a methyl methacrylate-based polymer [I] having a triad syndiotacticity (rr) of not less than 65%, a methyl methacrylate-based polymer [II] having a triad syndiotacticity (rr) of 45 to 58%, and the polycarbonate resin in a mass ratio of the methyl methacrylate-based polymer [I] to the methyl methacrylate-based polymer [II] of 40/60 to 70/30.

25. A method for manufacturing the methacrylic resin composition according to claim 7, the method comprising
melt-kneading a methyl methacrylate-based polymer [I] having a triad syndiotacticity (rr) of not less than 65%, a methyl methacrylate-based polymer [II] having a triad syndiotacticity (rr) of 45 to 58%, and the crosslinked rubber in a mass ratio of the methyl methacrylate-based polymer [I] to the methyl methacrylate-based polymer [II] of 40/60 to 70/30.

26. A method for manufacturing the methacrylic resin composition according to claim 8, the method comprising
melt-kneading a methyl methacrylate-based polymer [I] having a triad syndiotacticity (rr) of not less than 65%, a methyl methacrylate-based polymer [II] having a triad syndiotacticity (rr) of 45 to 58%, and the phenoxy resin in a mass ratio of the methyl methacrylate-based polymer [I] to the methyl methacrylate-based polymer [II] of 40/60 to 70/30.

* * * * *